(12) United States Patent
Bauer et al.

(10) Patent No.: US 10,829,718 B2
(45) Date of Patent: Nov. 10, 2020

(54) DETERGENT COMPOSITION COMPRISING A CARBINOL FUNCTIONAL TRISILOXANE

(71) Applicants: Dow Silicones Corporation, Midland, MI (US); Dow Corning Toray Co., Ltd., Tokyo (JP)

(72) Inventors: Paula Michele Bauer, Freeland, MI (US); Severine Cauvin, Mons (BE); Eric J. Joffre, Midland, MI (US); Lenin J. Petroff, Bay City, MI (US); Martin K. Severance, Midland, MI (US); Tsunehito Sugiura, Chiba (JP); Seiki Tamura, Chiba (JP); Zachary R. Wenzlick, Freeland, MI (US)

(73) Assignees: DOW SILICONES CORPORATION, Midland, MI (US); DOW TORAY CO., LTD., Tokyo (JP)

( * ) Notice: Subject to any disclaimer, the term of this patent is extended or adjusted under 35 U.S.C. 154(b) by 59 days.

(21) Appl. No.: 16/096,979

(22) PCT Filed: Apr. 26, 2017

(86) PCT No.: PCT/US2017/029597
§ 371 (c)(1),
(2) Date: Oct. 26, 2018

(87) PCT Pub. No.: WO2017/189703
PCT Pub. Date: Nov. 2, 2017

(65) Prior Publication Data
US 2019/0112549 A1 Apr. 18, 2019

Related U.S. Application Data

(60) Provisional application No. 62/328,072, filed on Apr. 27, 2016.

(51) Int. Cl.
| | | |
|---|---|---|
| C11D 1/83 | (2006.01) | |
| C11D 3/16 | (2006.01) | |
| C07F 7/08 | (2006.01) | |
| C11D 3/43 | (2006.01) | |
| C11D 11/00 | (2006.01) | |
| C11D 17/00 | (2006.01) | |
| C11D 1/22 | (2006.01) | |
| C11D 1/29 | (2006.01) | |
| C11D 1/72 | (2006.01) | |

(52) U.S. Cl.
CPC ........... C11D 3/162 (2013.01); C07F 7/0838 (2013.01); C11D 1/83 (2013.01); C11D 3/43 (2013.01); C11D 11/0017 (2013.01); C11D 11/0023 (2013.01); C11D 17/0008 (2013.01); *C11D 1/22* (2013.01); *C11D 1/29* (2013.01); *C11D 1/72* (2013.01)

(58) Field of Classification Search
CPC ......... C11D 1/83; C11D 3/162; C11D 3/2044; C11D 9/36; C11D 11/0017; C11D 11/0023
See application file for complete search history.

(56) References Cited

U.S. PATENT DOCUMENTS

| | | |
|---|---|---|
| 3,159,601 A | 12/1964 | Ashby |
| 3,220,972 A | 11/1965 | Lamoreaux |
| 3,296,291 A | 1/1967 | Chalk et al. |
| 3,381,019 A | 4/1968 | Morehouse |
| 3,389,160 A | 6/1968 | Reid |
| 3,419,593 A | 12/1968 | Willing |
| 3,516,946 A | 6/1970 | Modic |
| 3,563,901 A | 2/1971 | Crotty |
| 3,715,334 A | 2/1973 | Karstedt |

(Continued)

FOREIGN PATENT DOCUMENTS

| | | |
|---|---|---|
| CA | 2576300 A1 | 3/2006 |
| DE | 4318536 A1 | 12/1994 |

(Continued)

OTHER PUBLICATIONS

International Search Report for PCT/US2017/029597 dated Jul. 10, 2017, 5 pages.
English language abstract and machine assisted translation for JPS62068820 (A) extracted from http://worldwide.espacenet.com database on Sep. 10, 2018, 6 pages.
English abstract and machine assisted translation for JPS63139106 (A) extracted from http://worldwide.espacenet.com database on Sep. 10, 2018, 7 pages.
English abstract and machine assisted translation for DE4318536 (A1) extracted from http://worldwide.espacenet.com database on Sep. 10, 2018, 37 pages.

(Continued)

*Primary Examiner* — Charles I Boyer
(74) *Attorney, Agent, or Firm* — Warner Norcross + Judd LLP

(57) ABSTRACT

A detergent composition comprises a trisiloxane having at least one carbinol functional group. The trisiloxane comprises the reaction product of (A) an initial trisiloxane and (B) an organic compound. Component (A) has a pendant silicon-bonded functional group selected from a hydrogen atom, an epoxy-containing group, an ethylenically unsaturated group, and an amine group. Typically, component (A) is free of certain terminal silicon-bonded functional groups and is free of polyoxyalkylene groups. Component (B) has a functional group reactive with the pendant silicon-bonded functional group of component (A), and has at least one hydroxyl functional group. The trisiloxane may be of the following general formula (I): $(R^1_3SiO_{1/2})(R^1R^3SiO_{2/2})(R^1_3SiO_{1/2})$ (I). In formula (I), each $R^1$ is an independently selected hydrocarbyl group. $R^3$ may be selected from the groups (i) to (x) described herein, each of the groups having at least one carbinol group. Typically, the trisiloxane has 1-6 carbinol groups.

17 Claims, 3 Drawing Sheets

(56) References Cited

U.S. PATENT DOCUMENTS

| | | | |
|---|---|---|---|
| 3,814,730 A | 6/1974 | Karstedt | |
| 3,923,705 A | 12/1975 | Smith | |
| 3,928,629 A | 12/1975 | Chandra et al. | |
| 3,989,668 A | 11/1976 | Lee et al. | |
| 4,431,789 A * | 2/1984 | Okazaki | C08G 77/46 525/479 |
| 4,443,270 A | 4/1984 | Biard et al. | |
| 4,492,646 A | 1/1985 | Welch | |
| 4,656,162 A | 4/1987 | Itoh et al. | |
| 4,911,852 A | 3/1990 | Coffindaffer et al. | |
| 4,911,853 A | 3/1990 | Coffindaffer et al. | |
| 5,036,117 A | 7/1991 | Chung et al. | |
| 5,175,325 A | 12/1992 | Brown et al. | |
| 5,635,163 A | 6/1997 | Hansenne | |
| 5,741,765 A | 4/1998 | Leach | |
| 5,750,483 A | 5/1998 | Welch et al. | |
| 5,762,647 A | 6/1998 | Brown et al. | |
| 5,891,977 A | 4/1999 | Dietz et al. | |
| 6,040,288 A | 3/2000 | Popoff et al. | |
| 6,169,063 B1 | 1/2001 | Kvietok et al. | |
| 6,197,876 B1 | 3/2001 | Policello et al. | |
| 6,200,581 B1 | 3/2001 | Lin et al. | |
| 6,274,539 B1 | 8/2001 | Kacher et al. | |
| 6,310,029 B1 | 10/2001 | Kilgour et al. | |
| 6,521,587 B1 | 2/2003 | L'Hostis et al. | |
| 6,605,734 B2 | 8/2003 | Roy et al. | |
| 6,972,279 B2 | 12/2005 | Deak et al. | |
| 7,655,744 B2 | 2/2010 | Miyanaga | |
| 7,867,966 B2 | 1/2011 | Seebeck et al. | |
| 7,994,111 B2 | 8/2011 | Caggioni et al. | |
| 7,998,903 B2 * | 8/2011 | Nakanishi | C08G 77/38 504/358 |
| 8,158,570 B2 | 4/2012 | Batchelor et al. | |
| 8,246,696 B2 | 8/2012 | Man et al. | |
| 8,268,016 B2 | 9/2012 | Batchelor et al. | |
| 8,512,480 B2 | 8/2013 | Gomez Ruiz et al. | |
| 8,691,880 B2 | 4/2014 | Cauvin et al. | |
| 8,715,369 B2 | 5/2014 | Batchelor et al. | |
| 2002/0082170 A1 * | 6/2002 | Policello | A01N 25/10 504/358 |
| 2004/0005991 A1 | 1/2004 | Boucher et al. | |
| 2007/0125716 A1 * | 6/2007 | Procter | C02F 1/547 210/708 |
| 2007/0184006 A1 | 8/2007 | Ferenz et al. | |
| 2007/0219110 A1 | 9/2007 | Becker et al. | |
| 2009/0062459 A1 | 3/2009 | Thum et al. | |
| 2010/0081781 A1 * | 4/2010 | Schubert | C08G 65/22 528/14 |
| 2010/0330011 A1 | 12/2010 | Kennan et al. | |
| 2011/0112005 A1 | 5/2011 | Brooker et al. | |
| 2013/0261043 A1 | 10/2013 | Bello et al. | |
| 2013/0274167 A1 | 10/2013 | Gutowski et al. | |
| 2013/0327364 A1 | 12/2013 | Delbrassinne et al. | |
| 2014/0088212 A1 | 3/2014 | Dai et al. | |
| 2014/0106439 A1 | 4/2014 | Mussmann et al. | |
| 2014/0261561 A1 | 9/2014 | Nunes | |
| 2015/0004107 A1 | 1/2015 | Sawayama et al. | |
| 2015/0011656 A1 * | 1/2015 | Tamura | A61Q 1/08 514/772 |
| 2015/0329802 A1 | 11/2015 | Eiting et al. | |
| 2016/0052849 A1 * | 2/2016 | Souda | C07C 41/03 525/479 |

FOREIGN PATENT DOCUMENTS

| | | |
|---|---|---|
| DE | 19524815 A1 | 1/1997 |
| EP | 0363346 A2 | 4/1990 |
| EP | 0375028 A2 | 6/1990 |
| EP | 0535596 A1 | 4/1993 |
| EP | 0691327 A1 | 1/1996 |
| EP | 0786515 A2 | 7/1997 |
| EP | 0879840 A2 | 5/1998 |
| EP | 1043443 A1 | 10/2000 |
| EP | 1343933 B1 | 5/2007 |
| EP | 2039749 A1 | 9/2008 |
| JP | S52114699 A | 9/1977 |
| JP | S62068820 A | 3/1987 |
| JP | S63139106 A | 6/1988 |
| JP | H0420531 A | 1/1992 |
| JP | H06089147 B | 11/1994 |
| JP | H0741794 A | 2/1995 |
| JP | H08257390 A | 10/1996 |
| JP | H09278891 A | 10/1997 |
| JP | H09316085 A | 12/1997 |
| JP | 2865425 B2 | 3/1999 |
| JP | 2002537459 A | 11/2002 |
| JP | 4020531 B2 | 12/2007 |
| JP | 4430458 B2 | 3/2010 |
| JP | 2010520278 A | 6/2010 |
| WO | 1994029322 A1 | 12/1994 |
| WO | WO9429324 A1 | 12/1994 |
| WO | WO9839401 A1 | 9/1998 |
| WO | WO0248447 A1 | 6/2002 |
| WO | WO2006127883 A2 | 11/2006 |
| WO | 2008111926 A2 | 9/2008 |
| WO | WO2008122388 A1 | 10/2008 |
| WO | 2009085297 A2 | 7/2009 |
| WO | WO2009085300 A2 | 7/2009 |
| WO | WO2011064255 A1 | 6/2011 |
| WO | WO2011089410 A1 | 7/2011 |
| WO | WO2014037700 A1 | 3/2014 |
| WO | WO2014121037 A1 | 8/2014 |
| WO | WO2016008765 A1 | 1/2016 |
| WO | WO2016057288 A1 | 4/2016 |

OTHER PUBLICATIONS

English abstract and machine assisted translation for DE19524815 (A1) extracted from http://worldwide.espacenet.com database on Sep. 10, 2018, 15 pages.

English abstract and machine assisted translation for JPH0420531 (A) extracted from http://worldwide.espacenet.com database on Sep. 10, 2018, 11 pages.

ECOLEX: Legislation: Record details, "Commission Regulation (EC) No. 907/2006 amending Regulation (EC) No. 348/2004 of the European Parliament and of the Council on detergents, in order to adapt Annexes III and VII thereto", dated Jun. 21, 2006, Official Journal of the European Union L 168, Eur64668.pdf available at europa.eu, pp. 5-10.

ECOLEX: Legislation: Record details, "Commission Regulation (EC) No. 551/2009 amending Regulation (EC) No. 648/2004 of the European Parliament and of the Council on detergents, in order to adapt Annexes V and VI thereto", dated Jun. 26, 2009, Official Journal of the European Union L 164, pp. 3-6, Eur88501.pdf available at europa.eu.

ECOLEX: Legislation: Record details, "Regulation (EC) No. 648/2004 of the European Parliament and of the Council on detergents", dated Apr. 8, 2004, Official Journal of the European Union L 104, pp. 1-35, Eur42319.pdf available at europa.eu.

R. Wagner et al. "Silicon-Modified Carbohydrate Surfactants I: Synthesis of Siloxanyl Moieties Containing Straight-Chained Glycosides and Amides", Applied Organometallic Chemistry, vol. 10, pp. 421-435, 1996.

Air Products, "Tomadol Ethoxylated Alcohols" product guide, Pub. No. 110-10-002-US, 2010, www.airproducts.com/nimble, 36 pages.

"Soaps and Detergents" pamphlet, The Soap and Detergent Association, www.cleaning101.com, 32 pages.

R. Wagner et al. "Silicon-Modified Carbohydrate Surfactants II: Siloxanyl Moieties Containing Branched Structures", Aug. 7, 1995, 14 pages.

English abstract and machine assisted translation for JP4020531 (B2) extracted from http://worldwide.espacenet.com database on Jan. 7, 2019, 16 pages.

English abstract and machine assisted translation for JPH08257390 (A) extracted from http://worldwide.espacenet.com database on Sep. 10, 2018, 10 pages.

English abstract and machine assisted translation for JP4430458 (B2) extracted from http://worldwide.espacenet.com database on Sep. 10, 2018, 17 pages.

(56) References Cited

OTHER PUBLICATIONS

English abstract and machine assisted translation for WO9429324 (A1) extracted from http://worldwide.espacenet.com database on Sep. 10, 2018, 80 pages.
English abstract and machine assisted translation for JPH09316085 (A) extracted from http://worldwide.espacenet.com database on Sep. 10, 2018, 11 pages.
English abstract and machine assisted translation for JPH0741794 (A) extracted from http://worldwide.espacenet.com database on Sep. 19, 2018, 12 pages.
International Search Report for PCT/US2017/029598 dated Oct. 17, 2017, 5 pages.
Machine assisted English translation of JPS52114699A obtained from https://worldwide.espacenet.com on Oct. 16, 2019, 6 pages.
Machine assisted English translation of JPH09278891A obtained from https://patents.google.com on Oct. 16, 2019, 9 pages.
Applied Organometallic Chemistry, 1996, vol. 10, pp. 437-450.
Applied Organometallic Chemistry, 1999, vol. 13, pp. 21-28.
Machine assisted English translation of WO1994029322A1 obtained from https://patents.google.com/patent on Jul. 28, 2020, 24 pages.
R. Wagner et al., "Silicon-Modified Carbohydrate Surfactants VIII. Equilibrium Wetting of Perfluorinated Solid Surfaces by Solutions of Surfactants Above and Below the Critical Micelle Concentration-Surfactant Distribution Between Liquid-vapour and Solid-liquid Interfaces", Appl. Organometal. Chem. 13, 21-28 (1999).

\* cited by examiner

DETERGENT COMPOSITION COMPRISING A CARBINOL FUNCTIONAL TRISILOXANE

CROSS-REFERENCE TO RELATED APPLICATIONS

This application is the National Stage of International Application No. PCT/US2017/029597 filed on 26 Apr. 2017, which claims priority to and all advantages of U.S. Provisional Patent Appl. No. 62/328,072 filed on 27 Apr. 2016, the content of which is hereby incorporated by reference.

The present invention generally relates to a detergent composition, and more specifically to a detergent composition comprising a trisiloxane having at least one carbinol functional group. The trisiloxane is typically free of polyoxyalkylene groups, e.g. the trisiloxane is PEG-free, and is useful as a detergent additive in the detergent composition while generally meeting requirements according to Regulation (EC) No. 648/2004 of the European Parliament and of the Council on detergents.

Trisiloxane polyether materials are known to be effective surfactants. They can reduce the surface energy of aqueous solutions to around 20 dynes/cm at low concentrations. This has allowed them to be utilized in a range of applications such as agricultural adjuvants, inks and coatings.

Unfortunately, the chemical makeup of trisiloxane polyether materials has presented a number of issues. For example, the use of trisiloxane polyether materials in many detergent applications has been limited because most commercial trisiloxane polyether materials are either soluble or easily dispersible in water. This classifies the trisiloxane polyether materials as "surfactants" per the European Union (EU) detergent directive (i.e., Regulation (EC) No. 648/2004 of the European Parliament and of the Council on detergents). Thus, the trisiloxane polyether materials must be readily biodegradable by methods defined in the EU detergent directive. Based on the common methodology of biodegradation, trisiloxane polyether materials are not known to biodegrade sufficiently to satisfy the EU detergent directive. Hence, the use of trisiloxane polyether materials in these applications is limited.

In view of the foregoing, there remains an opportunity to provide improved trisiloxane materials for use in detergent compositions. There also remains an opportunity to provide detergent compositions comprising such trisiloxane materials.

BRIEF SUMMARY OF THE INVENTION

A detergent composition comprising a trisiloxane is provided. The trisiloxane has at least one carbinol functional group. The trisiloxane comprises the reaction product of (A) an initial trisiloxane and (B) an organic compound. Component (A) has a pendant silicon-bonded functional group. The pendant silicon-bonded functional group is generally selected from a hydrogen atom, an epoxy-containing group, an ethylenically unsaturated group, and an amine group. Typically, component (A) is free of a terminal silicon-bonded functional group selected from a hydrogen atom, an epoxy-containing group, an ethylenically unsaturated group, and an amine group. Component (A) is also typically free of polyoxyalkylene groups. Component (B) has a functional group reactive with the pendant silicon-bonded functional group of component (A). Component (B) also has at least one hydroxyl functional group.

The trisiloxane is subject to the following provisos. If the pendant silicon-bonded functional group of component (A) is a hydrogen atom, the functional group of component (B) is an ethylenically unsaturated group. If the pendant silicon-bonded functional group of component (A) is an epoxy-containing group, the functional group of component (B) is an amine group. If the pendant silicon-bonded functional group of component (A) is an ethylenically unsaturated group, the functional group of component (B) is a hydrogen atom. If the pendant silicon-bonded functional group of component (A) is an amine group, the functional group of component (B) is an epoxy-containing group.

In various embodiments, the trisiloxane is of the following general formula (I):

$$(R^1_3SiO_{1/2})(R^1R^3SiO_{2/2})(R^1_3SiO_{1/2}) \qquad (I).$$

In formula (I) above, each $R^1$ is an independently selected hydrocarbyl group. $R^3$ may be selected from the following groups (i) to (x):

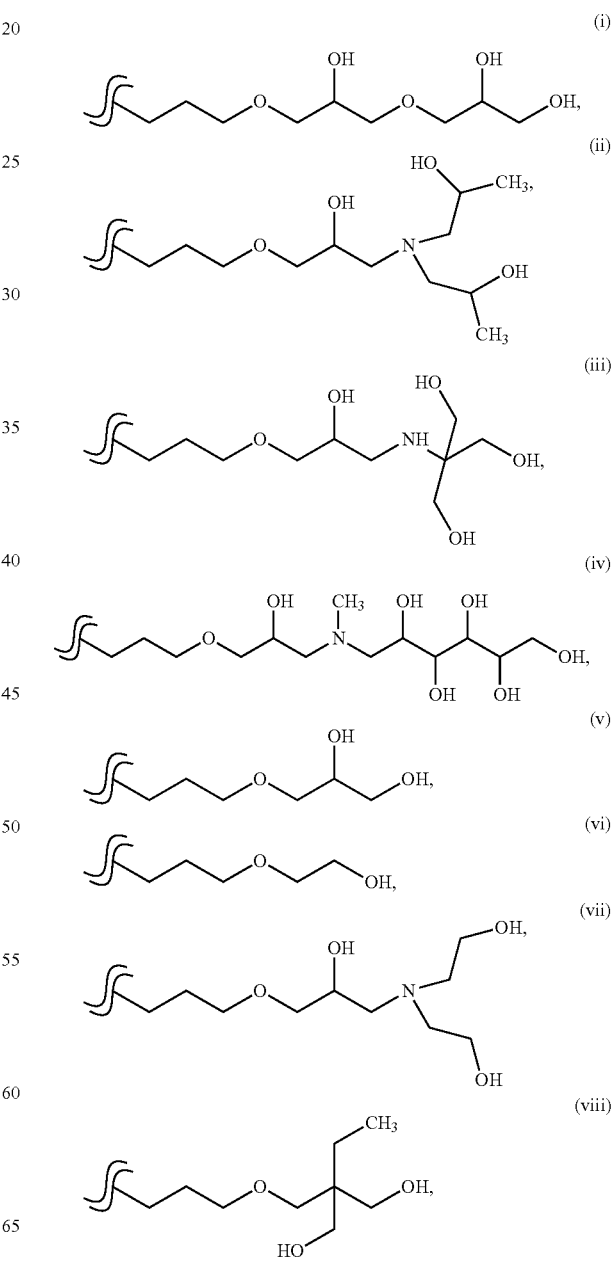

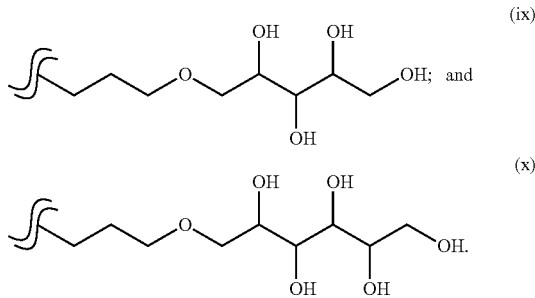

(ix)

(x)

DETAILED DESCRIPTION

Figure 1:
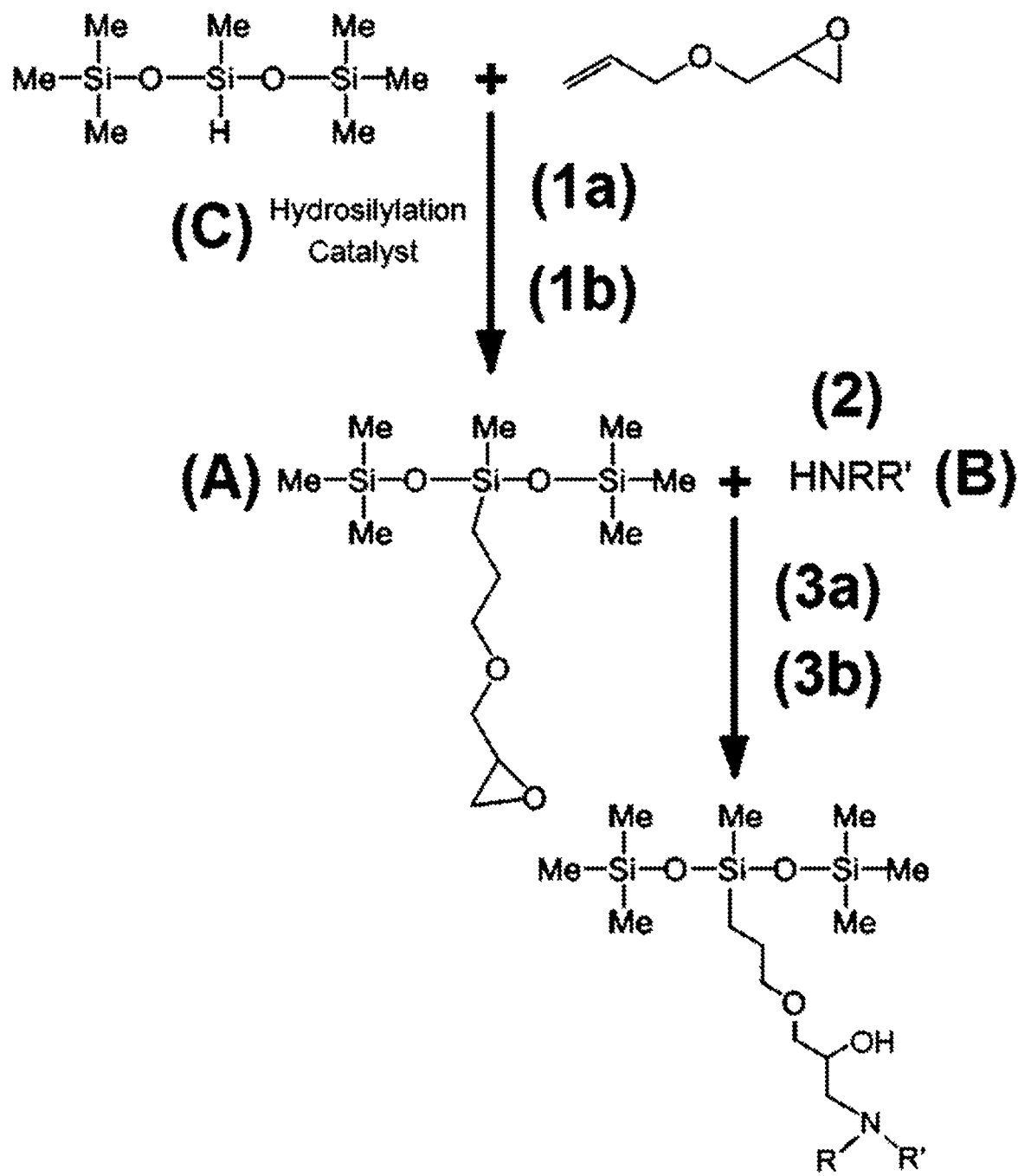
FIG. 1 is a reaction scheme illustrating a method of forming a trisiloxane.

The term "ambient temperature" or "room temperature" refers to a temperature between about 20° C. and about 30° C. Usually, room temperature ranges from about 20° C. to about 25° C. All viscosity measurements referred to herein were measured at 25° C. unless otherwise indicated. The following abbreviations have these meanings herein: "Me" means methyl, "Et" means ethyl, "Pr" means propyl, "Bu" means butyl, "g" means grams, "ppm" means parts per million, "h" means hours, "GC/MS" means gas chromatography and mass spectrometry, and "NMR" means nuclear magnetic resonance.

"Hydrocarbyl" means a monovalent hydrocarbon group which may be substituted or unsubstituted. Specific examples of hydrocarbyl groups include alkyl groups, alkenyl groups, alkynyl groups, aryl groups, aralkyl groups, etc.

"Alkyl" means an acyclic, branched or unbranched, saturated monovalent hydrocarbon group. Alkyl is exemplified by, but not limited to, Me, Et, Pr (e.g. iso-Pr and/or n-Pr), Bu (e.g. iso-Bu, n-Bu, tert-Bu, and/or sec-Bu), pentyl (e.g. iso-pentyl, neo-pentyl, and/or tert-pentyl), hexyl, heptyl, octyl, nonyl, decyl, undecyl, and dodecyl as well as branched saturated monovalent hydrocarbon groups of 6-12 carbon atoms. Alkyl groups may have 1-30, alternatively 1-24, alternatively 1-20, alternatively 1-12, alternatively 1-10, and alternatively 1-6, carbon atoms.

"Alkenyl" means an acyclic, branched or unbranched, monovalent hydrocarbon group having one or more carbon-carbon double bonds. Alkenyl is exemplified by, but not limited to, vinyl, allyl, methallyl, propenyl, and hexenyl. Alkenyl groups may have 2-30, alternatively 2-24, alternatively 2-20, alternatively 2-12, alternatively 2-10, and alternatively 2-6, carbon atoms.

"Alkynyl" means an acyclic, branched or unbranched, monovalent hydrocarbon group having one or more carbon-carbon triple bonds. Alkynyl is exemplified by, but not limited to, ethynyl, propynyl, and butynyl. Alkynyl groups may have 2-30, alternatively 2-24, alternatively 2-20, alternatively 2-12, alternatively 2-10, and alternatively 2-6, carbon atoms.

"Aryl" means a cyclic, fully unsaturated, hydrocarbon group. Aryl is exemplified by, but not limited to, cyclopentadienyl, phenyl, anthracenyl, and naphthyl. Monocyclic aryl groups may have 5-9, alternatively 6-7, and alternatively 5-6, carbon atoms. Polycyclic aryl groups may have 10-17, alternatively 10-14, and alternatively 12-14, carbon atoms.

"Aralkyl" means an alkyl group having a pendant and/or terminal aryl group or an aryl group having a pendant alkyl group. Exemplary aralkyl groups include tolyl, xylyl, mesityl, benzyl, phenylethyl, phenyl propyl, and phenyl butyl.

"Alkenylene" means an acyclic, branched or unbranched, divalent hydrocarbon group having one or more carbon-carbon double bonds. "Alkylene" means an acyclic, branched or unbranched, saturated divalent hydrocarbon group. "Alkynylene" means an acyclic, branched or unbranched, divalent hydrocarbon group having one or more carbon-carbon triple bonds. "Arylene" means a cyclic, fully unsaturated, divalent hydrocarbon group.

"Carbocycle" and "carbocyclic" each mean a hydrocarbon ring. Carbocycles may be monocyclic or alternatively may be fused, bridged, or spiro polycyclic rings. Monocyclic carbocycles may have 3-9, alternatively 4-7, and alternatively 5-6, carbon atoms. Polycyclic carbocycles may have 7-17, alternatively 7-14, and alternatively 9-10, carbon atoms. Carbocycles may be saturated or partially unsaturated.

"Cycloalkyl" means a saturated carbocycle. Monocyclic cycloalkyl groups are exemplified by cyclobutyl, cyclopentyl, and cyclohexyl. "Cycloalkylene" means a divalent saturated carbocycle.

The term "substituted" as used in relation to another group, e.g. a hydrocarbyl group, means, unless indicated otherwise, one or more hydrogen atoms in the hydrocarbyl group has been replaced with another substituent. Examples of such substituents include, for example, halogen atoms such as chlorine, fluorine, bromine, and iodine; halogen atom containing groups such as chloromethyl, perfluorobutyl, trifluoroethyl, and nonafluorohexyl; oxygen atoms; oxygen atom containing groups such as (meth)acrylic and carboxyl; nitrogen atoms; nitrogen atom containing groups such as amines, amino-functional groups, amido-functional groups, and cyano-functional groups; sulphur atoms; and sulphur atom containing groups such as mercapto groups.

M, D, T, and Q units are generally represented as $R_u SiO_{(4-u)/2}$, where u is 3, 2, 1, and 0 for M, D, T, and Q, respectively, and R is an independently selected hydrocarbyl group. The M, D, T, Q designate one (Mono), two (Di), three (Tri), or four (Quad) oxygen atoms covalently bonded to a silicon atom that is linked into the rest of the molecular structure.

Detergent Composition

A detergent composition comprising a trisiloxane is provided. The detergent composition may simply be referred to as a detergent. The term "detergent" generally means any substance, composition, formulation or preparation containing soaps and/or other surfactants intended for washing and cleaning processes. Suitable detergent compositions may be in any form (e.g. a liquid, gel, powder, paste, bar, cake, molded piece, shape, etc.) and marketed for or used in household, institutional, or industrial purposes.

The detergent composition is not limited to a particular form. Typically, the detergent composition is in a form suitable for dish washing, laundry washing, or hard surface washing. The term "washing" generally means the cleaning of laundry, fabrics, dishes and other soft or hard surfaces. In various embodiments, the detergent composition is in the form of a liquid (including concentrate and dilute forms), a gel, or a powder. Combinations of forms can also be utilized, such as pouches or sachets including, for example, at least two forms selected from liquids, gels, and/or powders (including free flowing and compressed powders).

Other products generally considered as detergents include: auxiliary washing preparations, which are generally intended for soaking (pre-washing), rinsing, cleaning or bleaching clothes, household linens, etc.; laundry fabric-softeners, which are generally intended to modify the feel of fabrics in processes which are to complement the washing of fabrics; cleaning preparations, which are generally intended for domestic all purposes cleaners and/or other cleaning of surfaces (e.g. materials, products, machinery, mechanical appliances, means of transport and associated equipment, instruments, apparatuses, etc.); and other cleaning and washing preparations, which are generally intended for any other washing and cleaning processes.

Trisiloxane

The trisiloxane may be referred to as a detergent additive. In many embodiments, the trisiloxane meets requirements according to Regulation (EC) No. 648/2004 of the European Parliament and of the Council on detergents, which is incorporated herein by reference along with any subsequent amendments/annexes thereof including EC Nos. 907/2006 and 551/2009. The trisiloxane is generally not a "surfactant" as defined according to EC No. 648/2004. Specifically, referring to EC No. 648/2004, the term "surfactant" is generally defined as any organic substance and/or preparation used in detergents, which has surface-active properties and which consists of one or more hydrophilic and one or more hydrophobic groups of such a nature and size that it is capable of reducing the surface tension of water, and of forming spreading or adsorption monolayers at the water/air interface, and of forming emulsions and/or microemulsions and/or micelles, and of adsorption at water-solid interfaces. Additional aspects in this regard can be appreciated with reference to the Examples section below.

The trisiloxane has at least one carbinol functional group is provided. The term "carbinol" refers to a hydroxyl group bound to a carbon atom (C—OH) and is differentiated from a hydroxyl group bound to a silicon atom (Si—OH). The carbinol functional group is generally linked to the siloxane backbone by a non-hydrolyzable moiety. The trisiloxane may also be referred to as a carbinol-functional trisiloxane, as a hydroxy-functional trisiloxane, and in some instances, as a polyol-functional trisiloxane.

As understood in the silicone art, trisiloxanes generally include a D unit flanked on each said by an M unit, i.e., by terminal M units. Moreover, trisiloxanes are generally free of both T and Q units.

In various embodiments, the trisiloxane has one (1) to six (6), alternatively two (2) to five (5), and alternatively three (3) to four (4), carbinol functional groups. Typically, the carbinol functional group(s) of the trisiloxane remain free at least prior to incorporation into the detergent composition, more typically after incorporation and prior to end use of the detergent composition (e.g. for washing). Carbinol functional groups are generally useful for aqueous applications due to their hydrophilicity, whereas siloxane backbones are useful for their hydrophobicity.

The trisiloxane comprises the reaction product of (A) an initial trisiloxane and (B) an organic compound. The term "initial" means that component (A) is different from the trisiloxane of the present invention, which is formed via reaction of components (A) and (B). The term "organic" means that component (B) comprises carbon, alternatively comprises carbon and hydrogen. In many embodiments, component (B) is free of silicon.

In various embodiments, the reaction product consists essentially of components (A) and (B). As used herein, the phrase "consisting essentially of" generally encompasses the specifically recited elements/components for a particular embodiment. Further, the phrase "consisting essentially of" generally encompasses and allows for the presence of additional or optional elements/components that do not materially impact the basic and/or novel characteristics of that particular embodiment. In certain embodiments, "consisting essentially of" allows for the presence of ≤10, ≤5, or ≤1, weight percent (wt %) of additional or optional components based on the total weight of the reaction product. In other embodiments, the reaction product consists of components (A) and (B).

As used herein, the designations "(A)" and "(B)" are not to be construed as requiring a particular order or indicating a particular importance of one component relative to the other. Specifically, enumeration may be used in the description of various embodiments. Unless otherwise expressly stated, the use of enumeration should not be construed as limiting the present invention to any specific order or number of components. Nor should the use of enumeration be construed as excluding from the scope of the present invention any additional components or steps that might be combined with or into the enumerated components or steps.

Component (A)

Component (A) has a pendant silicon-bonded functional group. The pendant silicon-bonded functional group is generally selected from a hydrogen atom, an epoxy-containing group, an ethylenically unsaturated group, and an amine group. The "pendant" silicon-bonded functional group is linked to the D unit of the trisiloxane.

In certain embodiments, the pendant silicon-bonded functional group is a hydrogen atom. In other embodiments, the pendant silicon-bonded functional group is an epoxy-containing group. The epoxy-containing group may be an epoxy group or an epoxy group linked to the silicone backbone by a non-hydrolyzable moiety. In other embodiments, the pendant silicon-bonded functional group is an ethylenically unsaturated group. Suitable ethylenically unsaturated groups for component (A) include alkenyl groups, e.g. vinyl, allyl, methallyl, propenyl, hexenyl, etc. In certain embodiments, component (A) has a pendant silicon-bonded alkenyl group, e.g. an allyl group. In yet other embodiments, the pendant silicon-bonded functional group is an amine group.

Typically, component (A) is free of a terminal silicon-bonded functional group selected from a hydrogen atom, an epoxy-containing group, an ethylenically unsaturated group, and an amine group. If they were present, such "terminal" silicon-bonded functional groups would be linked to at least one of the M units of the trisiloxane.

Typically, component (A) is free of polyoxyalkylene groups. If they were present, polyoxyalkylene groups may be imparted by, for example, the polymerization of ethylene oxide (EO), propylene oxide (PO), butylene oxide (BO), 1,2-epoxyhexane, 1,2-epoxyoctane, and/or cyclic epoxides, such as cyclohexene oxide or exo-2,3-epoxynorborane. Common polyoxyalkylene moieties in the art include oxyethylene units ($C_2H_4O$), oxypropylene units ($C_3H_6O$), oxybutylene units ($C_4H_8O$), or mixtures thereof. In certain embodiments, the trisiloxane may be referred to as being polyether-free, e.g. PEG-free, PEO-free, POE-free, PPG-free, PPDX-free, POP-free, PTMG-free, PTMEG-free, or PTHF-free. Such acronyms are understood in the art. In many embodiments, the trisiloxane is free of polyoxyalkylene groups.

In various embodiments, component (A) is of the following general formula (A1):

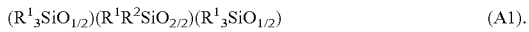

(A1).

In formula (A1) above, each $R^1$ is an independently selected hydrocarbyl group. In certain embodiments, each $R^1$ is an independently selected $C_1$-$C_6$ alkyl group. In specific embodiments, each $R^1$ is a methyl group. $R^2$ is the pendant silicon-bonded functional group.

In certain embodiments, $R^2$ is the hydrogen atom; so component (A) may be referred to as a hydrogentrisiloxane. In other embodiments, $R^2$ is the epoxy-containing group; so component (A) may be referred to as an epoxy-functional trisiloxane. In other embodiments, $R^2$ is the ethylenically unsaturated group; so component (A) may be referred to as an alkenyl-functional trisiloxane. In yet other embodiments, $R^2$ is the amine group; so component (A) may be referred to as an amine-functional trisiloxane.

Component (B)

Component (B) has at least one hydroxyl (—OH) functional group. The hydroxyl functional group is generally inert with respect to component (A). By "generally inert," it is meant that reaction of the hydroxyl functional group(s) is not intended. Specifically, while hydroxyl functional groups are reactive, e.g. with Si—H groups, reaction is minimized or generally avoided during formation of the trisiloxane such that a majority to all of the hydroxyl groups remain free. The hydroxyl functional group(s) of component (B) can be protected from side-reaction during formation of the trisiloxane by methods understood in the art, such as by controlling reaction conditions, order of addition, temporary blocking/capping, etc. The carbinol functional group(s) of the trisiloxane is/are typically linked to the D unit of the trisiloxane and is/are generally imparted by at least the hydroxyl functional group(s) of component (B), and optionally, an opened epoxy ring (the epoxy ring being present prior to reaction of components (A) and (B)). The hydroxyl functional group(s) may be terminal and/or pendant (with respect to the group/moiety pending from the D unit of the trisiloxane).

Component (B) also has a functional group reactive with the pendant silicon-bonded functional group of component (A). Specifically, the trisiloxane is subject to the following provisos. If the pendant silicon-bonded functional group of component (A) is the hydrogen atom, the functional group of component (B) is an ethylenically unsaturated group. If the pendant silicon-bonded functional group of component (A) is the epoxy-containing group, the functional group of component (B) is an amine group. If the pendant silicon-bonded functional group of component (A) is an ethylenically unsaturated group, the functional group of component (B) is a hydrogen atom. If the pendant silicon-bonded functional group of component (A) is an amine group, the functional group of component (B) is an epoxy-containing group. The functional group of component (B) may be terminal, internal or pendant. In various embodiments, the functional group of component (B) is terminal.

Suitable ethylenically unsaturated groups for component (B) include alkenyl groups, e.g. vinyl, allyl, methallyl, propenyl, hexenyl, etc. In various embodiments, component (B) has a terminal alkenyl group, e.g. an allyl group. Specific examples of suitable allyl compounds as component (B) include allyl glycerol, allyl diglycerol, allyl glycidyl ether (AGE), allyl sorbitol, etc. Allyl glycerol may also be referred to as allyloxyethanol. Allyl glycerol may also be referred to as allyl monoglycerol or allyloxy 1,2-propanediol. Other useful compounds as component (B) include epoxides such as glycidol and 4-vinyl-1-cyclohexene 1,2-epoxide. Other compounds having at least one epoxy and/or at least one ethylenically unsaturated group, and generally 1-6 hydroxyl group(s), are also contemplated.

In other embodiments, component (B) may be an amine compound, e.g. a secondary amine, provided there is also at least one hydroxyl functional group. Other suitable amine compounds as component (B) include alkanol modified amines such as generally: HNRR' where R and R' are alkyl and/or alkanol functionalities. One of R or R' typically contains a secondary hydroxyl functionality to provide the hydroxyl functional group(s). Specific examples of suitable alkanol amines as component (B) include diisopropanol amine (DIPA), diethanol amine (DEA), etc. Other compounds having at least one amine group and generally 1-6 hydroxyl group(s) are also contemplated.

In various embodiments, the pendant silicon-bonded functional group of component (A) is the hydrogen atom and component (B) is selected from the following components (B1) to (B6):

(B1)

(B2)

(B3)

(B4)

(B5) and

(B6)

In other embodiments, the pendant silicon-bonded functional group of component (A) is an epoxy-containing group and component (B) is selected from the following components (B7) to (B10):

(B7) [structure: HN with two -CH2CH2OH groups]

(B8) [structure: HN with -CH2CH(OH)CH3 and -CH2CH(OH)CH3]

(B9) [structure: H2N-C(CH2OH)3]

(B10) [structure: CH3-NH-CH2-CH(OH)-CH(OH)-CH(OH)-CH(OH)-CH2OH]

In certain embodiments, component (B) is component: (B1); (B2); (B3); (B4); (B5); (B6); (B7); (B8); (B9); or (B10). Combinations of components (A) and (B) may be utilized.

In other embodiments where the functional groups of components (A) and (B) are inversed, for example, where the pendant silicon-bonded functional group of component (A) is the amine group and the functional group of component (B) is the epoxy-containing group, component (B) is an epoxy compound, provided there is also at least one hydroxyl functional group. In these embodiments, component (B) may be an epoxy functional polyol. Such epoxy polyols may be selected from components similar to components (B7) to (B10), but where the amine group is generally replaced with an epoxy-containing group, e.g. an epoxy group (not shown). While not explicitly illustrated above, it is to be appreciated that other compounds suitable as component (B) can also be utilized.

In yet other embodiments, component (B) has a hydrogen atom, provided there is also at least one hydroxyl functional group. In these embodiments, the hydrogen atom is a silicon-bonded hydrogen atom (Si—H), which is generally required in instances were component (A) includes the ethylenically unsaturated group. Such a Si—H functional group of component (B) may be imparted by first reacting an initial organic compound with a silane, a polysiloxane, etc. Such reactions are understood by those skilled in the silicone art.

Trisiloxane

In various embodiments, the trisiloxane is of the following general formula (I):

$(R^1_3SiO_{1/2})(R^1R^3SiO_{2/2})(R^1_3SiO_{1/2})$ (I).

In formula (I) above, each $R^1$ is as described above with formula (A1). $R^3$ is typically an organic-based group having from 1-6 hydroxyl groups. In various embodiments, $R^3$ is selected from the following groups (i) to (x):

(i)–(x) [structures shown]

In certain embodiments, $R^3$ in general formula (I) above is group: (i); (ii); (iii); or (iv). In other embodiments, $R^3$ in general formula (I) above is group: (v); (vi); (vii); (viii); (ix); or (x).

In other embodiments where the functional groups of components (A) and (B) are inversed, for example, where the pendant silicon-bonded functional group of component (A) is the amine group and the functional group of component (B) is the epoxy-containing group, $R^3$ may be selected from groups similar to groups ii) to iv) or vii), but where the moieties imparted by the amine and epoxy-containing groups are generally inversed/reversed (not shown). One of skill in the art will appreciate such inversed structures, related structures and other structures suitable for other embodiments of the trisiloxane.

Method of Forming the Trisiloxane

A method of forming the trisiloxane is also provided. The method comprises the steps of 1) providing component (A) and 2) providing component (B). The method further comprises the step of 3) reacting components (A) and (B) to form the trisiloxane. Components (A) and (B) are as described above. Each of components (A) and (B) may be obtained or formed. For example, one or both of components (A) and (B) can be commercially obtained from a chemical supplier such as Dow Corning of Midland, Mich. Otherwise, one or both of components (A) and (B) can be formed from respective starting materials.

In a first general embodiment of the method, step 1) is further defined as 1a) reacting a hydrogentrisiloxane with an epoxy compound having an ethylenically unsaturated group in the presence of (C) a hydrosilylation catalyst to form a reaction intermediate having the epoxy-containing group. The reaction intermediate is component (A), specifically an epoxy-functional trisiloxane. In addition, step 3) is further defined as 3a) reacting component (B) and the reaction intermediate formed in step 1a) to form the trisiloxane. Component (B) is an amine compound. Optionally, the method further comprises the step(s) of 1 b) removing unreacted epoxy compound after step 1a), and/or 3b) removing unreacted component (B) after step 3a). Such removal may be accomplished via methods understood in the art, e.g. via stripping, evaporating, pulling vacuum, etc. Other reactants, carrier fluids, and/or reaction-intermediates can similarly be removed as desired. An example of the first general embodiment of the method is illustrated in FIG. 1.

Figure 2:
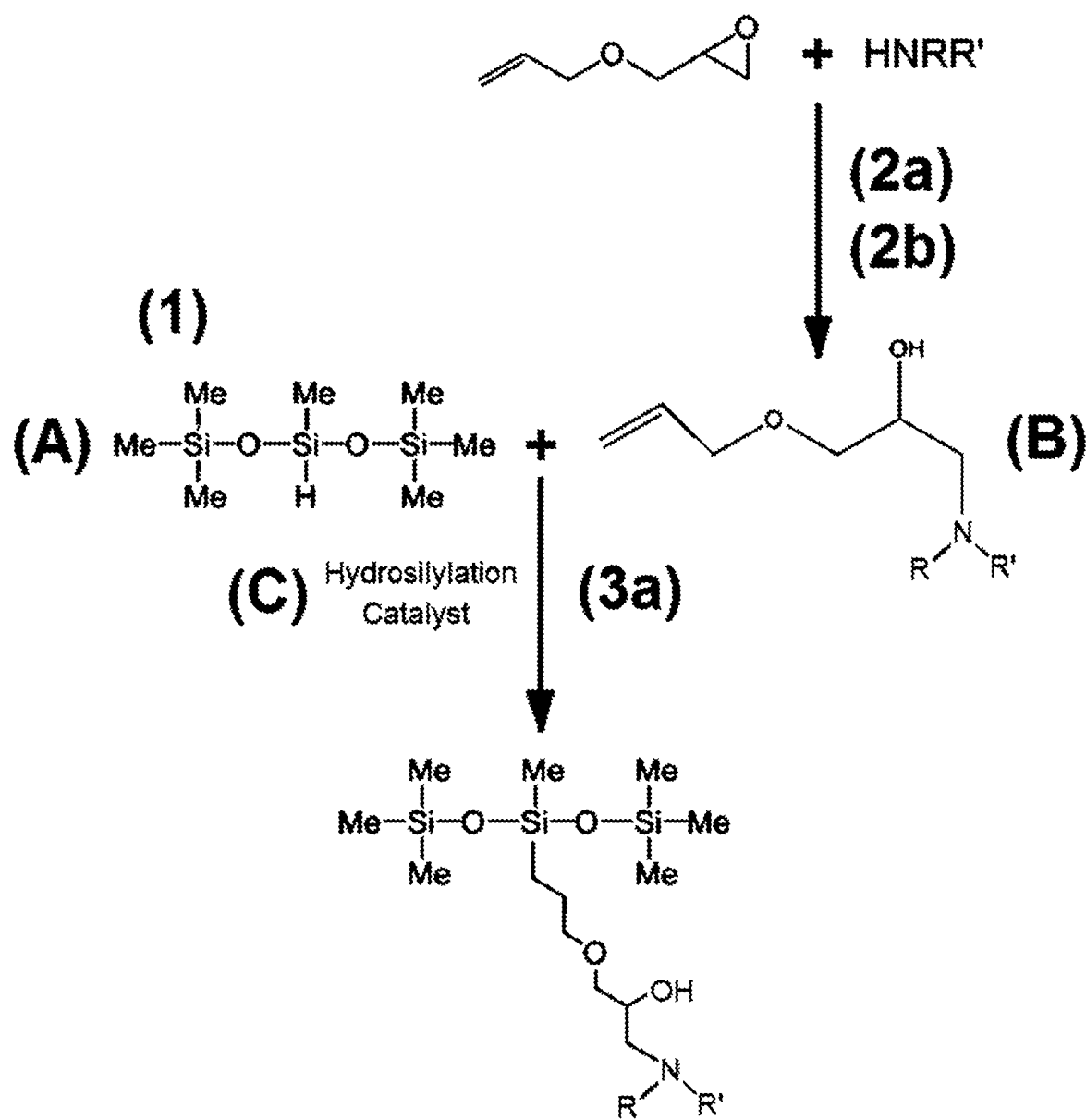
FIG. 2 is a reaction scheme illustrating an alternate method of forming the trisiloxane.

In a second general embodiment of the method, step 2) is further defined as 2a) reacting an amine compound having at least one hydroxyl functional group with an epoxy compound having an ethylenically unsaturated group to form a reaction intermediate having the ethylenically unsaturated group. The reaction intermediate is component (B). In addition, step 3) is further defined as 3a) reacting component (A) and the reaction intermediate formed in step 2a) in the presence of (C) a hydrosilylation catalyst to form the trisiloxane. Component (A) is a hydrogentrisiloxane (or silicone hydride). Optionally, the method further comprises the step(s) of 2b) removing unreacted compounds after step 2a), and/or 3b) removing unreacted component (A) after step 3a). Again, such removal may be accomplished via methods understood in the art. Other reactants, carrier fluids, and/or reaction-intermediates can similarly be removed as desired. An example of the second general embodiment of the method is illustrated in FIG. 2.

In a third general embodiment of the method (not shown), step 1) is further defined as 1a) reacting a hydrogentrisiloxane with an amine compound having an ethylenically unsaturated group in the presence of (C) a hydrosilylation catalyst to form a reaction intermediate having an amine group. The reaction intermediate is component (A), specifically an amine-functional trisiloxane. In addition, step 3) is further defined as 3a) reacting component (B) and the reaction intermediate formed in step 1a) to form the trisiloxane. Component (B) is an epoxy compound, such as glycidol. Optionally, the method further comprises the step(s) of 1 b) removing unreacted amine compound after step 1a), and/or 3b) removing unreacted component (B) after step 3a). Such removal may be accomplished via methods understood in the art. Other reactants, carrier fluids, and/or reaction-intermediates can similarly be removed as desired. In related embodiments of the method, the amine-functional trisiloxane (A) can be made in alternate manners understood in the art. For example, a chloropropyl functional trisiloxane can be reacted with ammonia to form component (A). One skilled in the art can readily appreciate other manners in which to obtain amine-functional trisiloxanes suitable as component (A) for forming the trisiloxane.

In a fourth general embodiment of the method (now shown), step 2) is further defined as 2a) reacting an epoxy compound having at least one hydroxyl functional group with an amine compound having an ethylenically unsaturated group to form a reaction intermediate having the ethylenically unsaturated group. The reaction intermediate is component (B). In addition, step 3) is further defined as 3a) reacting component (A) and the reaction intermediate formed in step 2a) in the presence of (C) a hydrosilylation catalyst to form the trisiloxane. Component (A) is a hydrogentrisiloxane (or silicone hydride). Optionally, the method further comprises the step(s) of 2b) removing unreacted compounds after step 2a), and/or 3b) removing unreacted component (A) after step 3a). Again, such removal may be accomplished via methods understood in the art. Other reactants, carrier fluids, and/or reaction-intermediates can similarly be removed as desired.

Components (A) and (B) can be reacted in various amounts to form the trisiloxane. Based on the number of respective functional groups, the components can be utilized in a 1:1 stoichiometric ratio (A:B). Higher or lower ratios may also be utilized. For example, excess component (A) or (B) may be desired for certain end-uses/applications of the trisiloxane or composition including the trisiloxane. Reaction conditions are not particularly limited. In certain embodiments, reaction is performed at a temperature of from room temperature to a reflux temperature for 1-24, alternatively 1-10, hours.

Component (C)

The hydrosilylation (or addition) reaction, e.g. between Si—H and ethylenically unsaturated groups, typically takes place in the presence of (C) a hydrosilylation catalyst. The hydrosilylation catalyst may be conventional to the art. For example, the hydrosilylation catalyst may be a platinum group metal-containing catalyst. By "platinum group" it is meant ruthenium, rhodium, palladium, osmium, iridium and platinum and complexes thereof. Non-limiting examples of hydrosilylation catalysts useful herein are described in U.S. Pat. Nos. 3,159,601; 3,220,972; 3,296,291; 3,419,593; 3,516,946; 3,715,334; 3,814,730; 3,923,705; 3,928,629; 3,989,668; 5,036,117; 5,175,325; and 6,605,734; each of which is incorporated herein by reference with respect to their disclosed hydrosilylation catalysts.

The hydrosilylation catalyst can be platinum metal, platinum metal deposited on a carrier, such as silica gel or powdered charcoal, or a compound or complex of a platinum group metal. Typical hydrosilylation catalysts include chloroplatinic acid, either in hexahydrate form or anhydrous form, and/or a platinum-containing catalyst which is obtained by a method comprising reacting chloroplatinic acid with an aliphatically unsaturated organosilicon compound, such as divinyltetramethyldisiloxane, or alkene-platinum-silyl complexes as described in U.S. Pat. No. 6,605,734. An example is: (COD)Pt(SiMeCl$_2$)$_2$ where "COD" is 1,5-cyclooctadiene. These alkene-platinum-silyl complexes may be prepared, e.g. by mixing 0.015 mole (COD)PtCl$_2$ with 0.045 mole COD and 0.0612 moles HMeSiCl$_2$.

One suitable platinum catalyst type is Karstedt's catalyst, which is described in Karstedt's U.S. Pat. Nos. 3,715,334 and 3,814,730. Karstedt's catalyst is a platinum divinyl tetramethyl disiloxane complex typically containing about 1 wt % of platinum in a solvent, such as toluene. Another suitable platinum catalyst type is a reaction product of chloroplatinic acid and an organosilicon compound containing terminal aliphatic unsaturation (described in U.S. Pat. No. 3,419,593).

The amount of hydrosilylation catalyst used is not particularly limited and typically depends upon the particular catalyst. The hydrosilylation catalyst is typically utilized in an amount sufficient to provide at least 2 ppm, more typically 4-200 ppm of platinum based on total weight percent solids (all non-solvent ingredients), based on one million parts of component (A) or (B). In various embodiments, the hydrosilylation catalyst is present in an amount sufficient to provide 1-150 weight ppm of platinum on the same basis. The hydrosilylation catalyst may be added as a single species or as a mixture of two or more different species.

Component (D)

The trisiloxane and/or components thereof are typically formed and/or provided in (D) a carrier fluid. Suitable carrier fluids (or carriers, diluents, solvents, or vehicles) include silicones, both linear and cyclic, organic oils, organic solvents and mixtures of these. Specific examples of solvents may be found in U.S. Pat. No. 6,200,581, which is incorporated herein by reference for this purpose. In various embodiments, the carrier fluid comprises a volatile siloxane, an organic solvent, or combination thereof.

In certain embodiments, the carrier fluid is a low viscosity silicone, a volatile methyl siloxane, a volatile ethyl siloxane, or a volatile methyl ethyl siloxane, having a viscosity at 25° C. in the range of 1-1,000 mm$^2$/sec. Suitable silicones/siloxanes include hexamethyldisiloxane, hexamethylcyclotrisiloxane, octamethylcyclotetrasiloxane (D4), decamethylcyclopentasiloxane (D5), dodecamethylcyclohexasiloxane, octamethyltrisiloxane, decamethyltetrasiloxane, dodecamethylpentasiloxane, tetradecamethylhexasiloxane, hexadeamethylheptasiloxane, heptamethyl-3-{(trimethylsilypoxy)}trisiloxane, hexamethyl-3,3,bis{(trimethylsilyl)oxy}trisiloxane, and pentamethyl{(trimethylsilyl)oxy}cyclotrisiloxane, as well as polydimethylsiloxanes, polyethylsiloxanes, polymethylethylsiloxanes, polymethylphenylsiloxanes, and polydiphenylsiloxanes.

Suitable organic solvents include aromatic hydrocarbons (e.g. toluene, xylene, etc.), aliphatic or alicyclic hydrocarbons (e.g. n-pentane, n-hexane, cyclohexane, etc.), alcohols (e.g. methanol, isopropanol, etc.), aldehydes, ketones, esters, ethers, glycols, glycol ethers, alkyl halides and aromatic halides. Suitable hydrocarbons include isododecane, isohexadecane, Isopar L (C$_{11}$-C$_{13}$), Isopar H (C$_{11}$-C$_{12}$), and hydrogenated polydecen. Suitable halogenated hydrocarbons include dichloromethane, chloroform, and carbon tetrachloride. Suitable ethers and esters include isodecyl neopentanoate, neopentylglycol heptanoate, glycol distearate, dicaprylyl carbonate, diethylhexyl carbonate, propylene glycol n-butyl ether, ethyl-3 ethoxypropionate, propylene glycol methyl ether acetate, tridecyl neopentanoate, propylene glycol methylether acetate (PGMEA), propylene glycol methylether (PGME), octyldodecyl neopentanoate, diisobutyl adipate, diisopropyl adipate, propylene glycol dicaprylate/dicaprate, and octyl palmitate. Additional organic carrier fluids suitable as a stand-alone compound or as an ingredient to the carrier fluid include fats, oils, fatty acids, and fatty alcohols. Additional examples of suitable carriers/solvents are described as "carrier fluids" in US Pat. App. Pub. No. 2010/0330011, which is incorporated herein by reference for this purpose.

To prevent undesirable side-reactions/reaction-products, the carrier fluid should be inert with respect to the reactants/reaction-intermediates utilized to form the trisiloxane. For example, the carrier fluid shouldn't have epoxy, Si—H, ethylenically unsaturated, and/or amine functional groups. The amount of carrier fluid used is not particularly limited. Combinations of carrier fluids can be utilized.

Detergent Composition (Detergent)

The detergent composition can be utilized for various applications and it is generally not limited to a particular one. For example, the detergent composition can be a dishwashing detergent composition (e.g. an auto dishwashing detergent (ADW) composition), a laundry detergent composition, a stain removal/pre-treatment composition, or a hard surface detergent composition (e.g. an auto care detergent). Further detergent applications include: personal care and personal cleansing products (e.g. body washes, shampoos, and conditioners); dishwashing products including hand dishwashing, automatic dishwashing, and dishwashing additives; laundry care including laundry detergents (e.g. hand wash/automatic detergents), fabric softeners, carpet cleaners, and laundry aids (e.g. spot and stain removers); surface care including multi-purpose cleaners, cleaners for ovens, window/glass, metal, kitchen, floor, bathroom surfaces, descalers, drain openers, scouring agents, household antiseptics/disinfectants, and household care wipes and floor cleaning systems; and toilet care products including in-cistern devices, rim blocks and liquids, and liquids, foams, gels and tablets for toilet care.

In various embodiments, the cleaning composition can be an aqueous solution, a gel, or a powder. The cleaning composition can be dispensed as such directly onto laundry fabrics or via a spray, a roll-on, and/or an adhesive patch (also directly onto the laundry fabrics) before a washing process. Such cleaning compositions can also be delivered within the washing and/or rinse phase of an automatic or manual laundry washing process.

The trisiloxane can be utilized in the detergent composition in various amounts. Suitable amounts for a particular end-use/application can be readily determined via routine experimentation. Combinations of trisiloxanes can be utilized.

In certain embodiments, the trisiloxane is present in an amount of from about 0.001 to about 20, alternatively about 0.001 to about 15, alternatively about 0.001 to about 10, alternatively about 0.01 to about 5, and alternatively about 0.01 to about 1, part(s) by weight, based on 100 parts by weight of the detergent composition. Such ranges are generally associated with a "final" or "consumer" detergent composition. As such, the amounts above can be increased or decreased by orders of magnitude to account for change in concentration and/or form. For example, in embodiments where the detergent composition is in the form of a concentrate, gel, or powder, the amounts above may be increased by about 10%, 25%, 50%, 100%, 200%, 300%, 400%, 500%, or more. If the detergent composition is diluted, the amounts above may be decreased in a similar manner.

In various embodiments, the detergent composition further comprises at least one dispersant. Various types of conventional dispersants associated with detergent compositions can be utilized. In specific embodiments, the dispersant comprises propylene glycol. The dispersant is useful for increasing compatibility of certain embodiments of the trisiloxane and/or amounts thereof in the detergent composition. The dispersant may also be a solvent.

In certain embodiments, the dispersant is present in an amount of from about 0.01 to about 50, alternatively about 0.1 to about 40, alternatively about 0.1 to about 30, alternatively about 0.1 to about 25, alternatively about 1 to about 20, alternatively about 2 to about 15, alternatively about 2 to about 10, and alternatively about 2 to about 5, part(s) by weight, based on 100 parts by weight of the detergent composition. Such ranges are generally associated with a "final" or "consumer" detergent composition. As such, the amounts above can be increased or decreased to account for change in concentration and/or form. For example, in embodiments where the detergent composition is in the form of a concentrate, gel, or powder, the amounts above may be increased by about 10%, 25%, 50%, 100%, 200%, 300%, 400%, 500%, or more. If the detergent composition is diluted, the amounts above may be decreased in a similar manner.

The detergent composition may further comprise any number of conventional compounds or additives understood in the art and such components can be utilized in various amounts. Such additional components may be primary or secondary, supplemental, or auxiliary components of the detergent composition in addition to the trisiloxane. Various additional components are described in greater detail below. It is to be appreciated that certain components may be classified under different terms of art and just because a component is classified under such a term does not mean that they are limited to that function. If utilized, the additional component(s) may be present in the detergent composition in various amounts. One of skill in the art can readily determine suitable amounts for a particular detergent composition.

Examples of additional components suitable for the detergent composition include surfactants, such as anionic surfactants, cationic surfactants, zwitterionic (amphoteric) surfactants, nonionic surfactants, or combinations thereof. Further components suitable for the detergent composition include abrasives, acids, alkalis/bases, antimicrobial agents, antiredeposition agents, antiscalants, bleaches, builders, chelating agents, colorants, complexing agents, corrosion inhibitors, electrolytes, enzymes, extenders, extracts, fabric softening agents, fillers, fluorescent whitening agents, fragrances/perfumes, foam inhibitors, formulation auxiliaries, hydrotropes, microfibers, opacifiers, preservatives, processing aids, rheology modifiers, salts, soaps, soil release polymers, solvents, solubility improvers, suds control agents, oils, thickeners, oxidizing agents, viscosity control agents, or combinations thereof. Further examples on some of these components and others are below.

In various embodiments, the detergent composition is an aqueous detergent composition including water (e.g. demineralized and/or DI water). Other solvents, carriers, or diluents can also be utilized in addition and/or alternate to water. Other suitable solvents include ethylene glycol, propylene glycol, 2-butoxyethanol, butyldiglycol, and alkyl glycol ethers. Further examples of suitable solvents include alkanolamines, and alcohols such as ethanol and isopropanol, or combinations thereof. Suitable alkanolamines include triisopropanolamine, N-methyldiethanolamine, and N-ethyldiethanolamine. In certain embodiments, the alkanolamine is an ethanolamine. Further examples of suitable ethanolamines include monoethanolamine (MEA), diethanolamine, triethanolamine, diethylethanolamine, triisopropanolamine, and dimethylethanolamine.

In certain embodiments, water is present in an amount of from about 50 to about 95, alternatively about 55 to about 90, alternatively about 60 to about 80, and alternatively about 60 to about 70, parts be weight, based on 100 parts by weight of the detergent composition. Such amounts can be increased or decreased as described above, e.g. to account for concentrating or diluting of the detergent composition. In some embodiments, the detergent composition is substantially to completely free of water.

Examples of suitable anionic surfactants for the detergent composition include linear alkylbenzene sulfonate (LAS), alcohol ethoxylates, and alky sulfates; suitable nonionic surfactants for the detergent composition include alcohol ethoxylates; suitable cationic surfactants for the detergent composition include quaternary ammonium compounds; and suitable amphoteric surfactants for the detergent composition include imidazolines, and betaines. Further suitable surfactants are described below.

Anionic surfactants suitable for the detergent composition include fatty alcohol sulfates, alkyl sulfates, fatty alcohol ether sulfates/alkyl ether sulfates, alkanesulfonates, and alkylbenzenesulfonates. Further examples in this context are $C_{12}$-$C_{18}$ fatty alcohol sulfates (FAS), e.g. SULFOPON® K 35 from BASF Corporation, $C_{12}$ fatty alcohol ether sulfate, e.g. TEXAPON® N70 from BASF Corporation, secondary $C_{13}$-$C_{17}$ alkanesulfonates (SAS), e.g. HOSTAPUR® SAS 93 from Clariant, and linear $C_8$-$C_{18}$ alkylbenzenesulfonates, in particular LAS. The terms "sulfate" and "sulfonate" also comprise, besides relevant anionic compounds that are present in the form of salts, the free acids, i.e. in particular the corresponding alkylsulfuric acids or alkylsulfonic acids.

In certain embodiments, at least one anionic surfactant is present in an amount of from about 0.1 to about 25, alternatively about 1 to about 15, alternatively about 2 to about 10, and alternatively about 3 to about 7, part(s) be weight, based on 100 parts by weight of the detergent composition. Such amounts can be increased or decreased as described above, e.g. to account for concentrating or diluting of the detergent composition.

Nonionic surfactants suitable for the detergent composition include polyalkylene oxide surfactants (also known as polyoxyalkylene surfactants or polyalkylene glycol surfactants). Suitable polyalkylene oxide surfactants include polyoxypropylene surfactants and polyoxyethylene glycol surfactants. Suitable surfactants of this type are synthetic organic polyoxypropylene (PO)-polyoxyethylene (ED) block copolymers. These surfactants generally comprise a di-block polymer comprising an EO block and a PO block, a center block of PO units, and having blocks of ED grafted onto the PO unit or a center block of ED with attached PO blocks. Further, this surfactant can have further blocks of either ED or PO in the molecules. The surfactant may also include butylene oxide (BO) blocks, and can include random incorporations of two or three alkylene oxides, e.g. EO/PO/BO, EO/PO/PO, EO/EO/PO, etc. Such surfactants may be referred to in the art as "heteric" block surfactants.

Additional nonionic surfactants suitable for the detergent composition include alcohol alkoxylates. Suitable alcohol alkoxylates include linear alcohol ethoxylates. Additional alcohol alkoxylates include alkylphenol ethoxylates, branched alcohol ethoxylates, secondary alcohol ethoxylates, castor oil ethoxylates, alkylamine ethoxylates (also known as alkoxylated alkyl amines), tallow amine ethoxylates, fatty acid ethoxylates, sorbital oleate ethoxylates, end-capped ethoxylates, or combinations thereof. Further nonionic surfactants include amides such as fatty alkanolamides, alkyldiethanolamides, coconut diethanolamide, lauramide diethanolamide, cocoamide diethanolamide, polyethylene glycol cocoamide, oleic diethanolamide, or combinations thereof. Yet further nonionic surfactants include polyalkoxylated aliphatic base, polyalkoxylated amide, glycol esters, glycerol esters, amine oxides, phosphate esters, alcohol phosphate, fatty triglycerides, fatty triglyceride esters, alkyl ether phosphate, alkyl esters, alkyl phenol ethoxylate phosphate esters, alkyl polysaccharides, block copolymers, alkyl polyglucocides, or combinations thereof.

In certain embodiments, at least one nonionic surfactant is present in an amount of from about 0.1 to about 25, alternatively about 1 to about 15, alternatively about 2 to about 10, and alternatively about 2 to about 5, part(s) be weight, based on 100 parts by weight of the detergent composition. Such amounts can be increased or decreased as described above, e.g. to account for concentrating or diluting of the detergent composition. Other types of surfactants may also be utilized in similar amounts.

Further non-limiting examples of suitable surfactant components for the detergent composition are commercially available from BASF Corporation, under the trade names of LUTENSOL®, such as LUTENSOL® XP 80, LUTENSOL® TO 8, LUTENSOL® GD 70; TETRONIC®, such as TETRONIC® 304; PLURAFAC®, such as PLURAFAC® SLF 180 and PLURAFAC® LF 711; and LUTENSIT®, such as LUTENSIT® AS 2230. Further non-limiting examples are commercially available from Huntsman, under the trade names of EMPILAN®, such EMPILAN® KB and EMPILAN® KC; SURFONIC®, such as SURFONIC® L12; TERIC®, such as TERIC® 12A; and ECOTERIC®, such as ECOTERIC® B30 and ECOTERIC® B35. Further non-limiting examples are commercially available from Croda, under the trade name of NatSurf™, such as NatSurf™ 265. Further non-limiting examples are commercially available from Stepan, under the trade names of BIO-SOFT®, such as the BIO-SOFT® N1, BIO-SOFT® N23, BIO-SOFT® N91, and BIO-SOFT® S-101; STEPANATE®, such as STEPANATE® SXS; and STEOL®, such as STEOL® CS-330. Yet further non-limiting examples are commercially available from Air Products, under the trade names of NONIDET®; and TOMADOL®, such as TOMADOL® 1-7 and TOMADOL® 25-7.

Examples of suitable abrasives for the detergent composition include calcite, feldspar, quartz, sand, or combinations thereof. Examples of suitable acids for the detergent composition include organic acids, inorganic acids, or combinations thereof. Further examples of suitable organic acids include straight chain or branched carboxylic acids including lactic acid, acetic acid, formic acid, ascorbic acid, oxalic acid, hydroxymaleic acid, methanesulphonic acid, mandelic acid, glycolic acid, salicylic acid, a pyranosidyl acid such as glucuronic acid or galacturonic acid, citric acid, tartaric acid, pamoic acid, alginic acid, gentisic acid, lactobionic acid, succinic acid, trichloroisocyanuric acid, polymers of maleic acid and acrylic acid, and copolymers thereof. Examples of suitable inorganic acids include hydrochloric acid, hypochlorous and chlorous acid, sulfuric acid, sulphurous acid, nitric acid, phosphoric acid, amidosulfonic/sulfamic acid, peracids, and phosphorous acid.

Examples of suitable alkalis for the detergent composition include ammonium hydroxide, potassium hydroxide, ethanolamines, sodium carbonate, sodium hydroxide, sodium silicate, or combinations thereof. Examples of suitable antimicrobial agents for the detergent composition include pine oil, quaternary ammonium compounds, sodium hypochlorite, triclocarban, triclosan, or combinations thereof. Examples of suitable antiredeposition agents for the detergent composition include carboxymethyl cellulose, polycarboxylates, polyethylene glycol, sodium silicate, or combinations thereof. Examples of suitable bleaches for the detergent composition include chlorine bleaches and oxygen bleaches, such as sodium hypochlorite, sodium perborate, sodium percarbonate, or combinations thereof. At least one bleach activator may also be utilized, which are especially useful in combination with certain oxygen bleaches.

Examples of suitable antiscalants for the detergent composition include certain polymer components. The polymer component may be referred to in the art as a dispersant and/or antiscalant. In various embodiments, the polymer component comprises a carboxylate functional polymer or a modified carboxylate functional polymer. In certain embodiments, the polymer component comprises a polyacrylic acid (PAA) and/or an acrylic/maleic copolymer. In one embodiment, the polymer component comprises PAA. Other examples of suitable polymers included polyacrylates having a molecular weight of from about 1,000 to about 400,000 and polymers based on acrylic acid combined with other moieties. These include acrylic acid combined with maleic acid; methacrylic acid; phosphonate; maleic acid and vinyl acetate; acrylamide; sulfophenol methallyl ether; 2-acrylamido-2-methylpropane sulfonic acid; 2-acrylamido-2-methylpropane sulfonic acid and sodium styrene sulfonate; methyl methacrylate, sodium methallyl sulfonate and sulfophenol methallyl ether; polymaleates; polymethacrylates; polyaspartates; ethylenediamine disuccinate; organo polyphosphonic acids and their salts. Examples of suitable polymeric components are commercially available from BASF Corporation under the trade name SOKALAN®, such as SOKALAN® CP 5, SOKALAN® CP 42, SOKALAN® CP 50, SOKALAN® PA 25 CL, and PA SOKALAN® PA 30 CL, SOKALAN® CP 10 S, SOKALAN® CP 12 S, and SOKALAN® 13 S. "CP" generally designates a copolymer whereas "PA" generally designates a polyacrylate.

Examples of suitable builders for the detergent composition include metal citrates, complex phosphates, sodium citrate, sodium carbonate, sodium silicate, sodium metasilicate, sodium aluminosilicate (zeolite), or combinations thereof. Certain builders, such as sodium citrate, can also be utilized for controlling water hardness. Examples of suitable chelating agents for the detergent composition include aminocarboxylates and salts thereof, such as methylglycine-N—N-diacetic acid (MGDA), nitrilotriacetic acid (NTA), hydroxyethylethylenediaminetriacetic acid (HEDTA), N,N-bis(carboxymethyl)-L-glutamate (GLDA), ethylenediaminetetraacetic acid (EDTA), diethylenetriaminepentaacetic acid (DTPA), or combinations thereof.

Examples of suitable colorants for the detergent composition include pigments, dyes, or combinations thereof. An example of a suitable corrosion inhibitor for the detergent composition is sodium silicate. Examples of suitable enzymes for the detergent composition include amylase, lipase, protease, cellulase, or combinations thereof. Examples of suitable fabric softening agents for the detergent composition include quaternary ammonium compounds. Examples of suitable fluorescent whitening agents (also referred to as optical brighteners) for the detergent composition include colorless fluorescing compounds.

Examples of suitable hydrotropes for the detergent composition include sulfonates, such as xylene sulfonates, cumene sulfonates, toluene sulfonates, and dihexyl sodium sulfonate; alkyl sulfates such as sodium octyl sulfate; urea; isopropanol and other alcohols such as ethyl alcohols; alcohol alkoxylates; glycols, such as hexylene glycol and propylene glycol; and those described in U.S. Pat. Nos. 3,563,901 and 4,443,270, which are incorporated herein by reference for this purpose. Non-limiting examples of suitable hydrotrope components are commercially available from BASF Corporation, under the trade name TEXAPON®, such as TEXAPON® 842.

In certain embodiments, at least one hydrotrope is present in an amount of from about 0.1 to about 25, alternatively about 0.1 to about 15, alternatively about 0.5 to about 10, and alternatively about 1 to about 5, part(s) be weight, based on 100 parts by weight of the detergent compositions. Such amounts can be increased or decreased as described above, e.g. to account for concentrating or diluting of the detergent composition.

Examples of suitable opacifiers for the detergent composition include polymers, titanium dioxide, zinc oxide, or combinations thereof. Examples of suitable preservatives for the detergent composition include butylated hydroxytoluene, ethylene diamine tetraacetic acid, glutaraldehyde, or combinations thereof. Examples of suitable processing aids for the detergent composition include clays, polymers, sodium silicate, sodium sulfate, solvents, or combinations thereof. Examples of suitable suds control agents for the detergent composition include suds stabilizers and suds suppressors, such as alkanolamides, alkylamine oxides, alkyl phosphates, silicones, soaps, or combinations thereof.

Additional types, forms, uses and components suitable for the detergent composition are described in U.S. Pat. Nos. 4,492,646; 5,750,483; 5,762,647; 6,169,063; 6,274,539; 6,521,587; 7,867,966; 7,994,111; 8,158,570; 8,246,696; 8,268,016; 8,512,480; 8,691,880; and 8,715,369; US Pat. App. Pub. Nos.: 2004/0005991; 2011/0112005; 2013/0261043; 2013/0274167; 2013/0327364; 2014/0261561; 2014/0106439; and 2015/0329802; International Pub. Nos.: WO2008/122388; WO2011/089410; WO2014/037700; and WO 2016/008765; and CA Pat No. 2576300; each of which is incorporated herein by reference for this purpose. One of skill in the art appreciates that conventional detergent formulations can be adjusted to account for inclusion of the trisiloxane(s) of the present invention.

The detergent composition typically has a pH of from about 5 to about 13, alternatively about 6 to about 12, alternatively about 7 to about 11, and alternatively about 7 to about 10, or any range between the lowest and highest of these values. The pH of the detergent composition is generally imparted by the type and amount of components utilized to form the detergent composition. If desired, pH buffer systems, e.g. a phosphate buffer or a citrate buffer, may be used for stabilizing the pH; however, they are not required.

In certain embodiments, the detergent composition is substantially free of phosphorus-containing compounds, making the detergent composition more environmentally acceptable. Phosphorus-free refers to a composition, mixture, or ingredients to which phosphorus-containing compounds are not added. Should phosphorus-containing compounds be present through contamination of a phosphorus-free composition, mixture, or ingredient, the level of phosphorus-containing compounds in the resulting detergent composition is typically less than about 0.5, alternatively less than about 0.1, and alternatively less than about 0.01, wt %, each based on 100 parts by weight of the detergent composition. In various embodiments, the detergent composition completely excludes phosphorus-containing compounds.

In various embodiments, the detergent composition is free of a chlorine-containing component. Examples of components containing chlorine include chlorine bleaches, which generally belong to a group of strong oxidizing agents, all of which have one or more chlorine atoms in their molecule. Specific examples of chlorine bleaches used in the art include chlorinated isocyanurates, chlorinated trisodium phosphate, hypochlorite, and sodium hypochlorite. By free of a chlorine-containing component, it is generally meant that the detergent composition is free of a purposefully added component including chlorine, such as the addition of chlorine bleach, e.g. sodium hypochlorite. In some embodiments, the detergent composition includes some trace amount of chlorine, such as a trace amount of chlorine present in one or more of the components.

In various embodiments, the detergent composition includes chlorine in an amount of from about 0.50 to approaching zero (0), alternatively about 0.25 to approaching 0, and alternatively about 0.10 to approaching 0, wt %, each based on 100 parts by weight of the detergent composition. In certain embodiments, the detergent composition completely excludes chlorine.

In some embodiments, the detergent composition is free of a bleach component. While chlorine bleaches tend to be commonly used bleach components, other bleaches include non-chlorine bleaches, such as peroxygen compounds, which release active oxygen in wash water. Further examples of non-chlorine bleaches include perborates/sodium perborates, potassium monopersulfates, sodium percarbonates, hydrogen peroxides, and organic peracids. In various embodiments, the detergent composition includes the bleach component in an amount of from about 15 to approaching zero (0), alternatively about 10 to approaching 0, alternatively about 5.0 to approaching 0, and alternatively about 1.0 to approaching 0, wt %, each based on 100 parts by weight of the detergent composition. In certain embodiments, the detergent composition completely excludes the bleach component.

Method of Forming the Detergent Composition

The detergent composition can be formed by various methods. Typically, the detergent composition is formed by simply combining, e.g. mixing, all of the components together. The detergent composition is not limited to any particular method of manufacture. One of ordinary skill in the art can readily determine suitable methods of manufacture based on a particular detergent composition, form, and/or end use thereof.

The following Examples, illustrating various trisiloxanes and related methods of formation, as well as detergent compositions comprising such trisiloxanes, are intended to illustrate and not limit the present invention.

Example 1: Hydrosilylation of Heptamethyltrisiloxane and 2-Allyloxyethanol 13.29 g of heptamethyltrisiloxane (98%, TCI America) and 20 g of toluene (99.5%, Fisher Scientific) were added to a reaction flask under a nitrogen purge and mixed with a magnetic stirrer. The mixture was kept under the nitrogen purge and heated to 40° C. A syringe was loaded with 7.87 g of 2-allyloxyethanol (98%, Aldrich) and placed into a syringe pump. Once at 40° C., the 2-allyloxyethanol was metered into the reaction at ~250 μL/min. After ~5% of 2-allyloxyethanol was added, 108.8 μL of a 1% platinum complex in hexamethyldisiloxane was added. The reaction exothermed initially and as the remaining 2-allyloxyethanol was added reaching a maximum temperature of 59.5° C. 6.82 g total of 2-allyloxyethanol was added. The reaction was held at 60° C. for 3 hours and then allowed to cool.

The resulting sample was treated with activated carbon and filtered. Unreacted heptamethyltrisiloxane (BisH) and toluene were stripped off using a rotary evaporator (Rotovap) for 3 hours (75° C., <10 mbar). The sample was then held at room temperature at 0.15 torr for 24 hours. 1H, 29Si and 13C confirmed the target hydrosilylated reaction product, with only trace isomers remaining. Specifically, the chemical composition after stripping was as follows: BisH-2-allyloxyethanol—99.46 wt %; and 2-allyloxyethanol isomers—0.54 wt %. The trisiloxane formed in this example has one hydroxyl functional (—OH) group. A reaction scheme of this example is illustrated immediately below.

sample was then held at room temperature at 0.2 torr for 24 hours. 1H, 29Si and 13C confirmed the target hydrosilylated reaction product, as well as ~4.37 wt % isomers and less than 0.1 wt % solvent remaining. Specifically, the chemical composition after stripping was as follows: BisH-Trimethylolpropane allyl ether—95.58 wt %; trimethylolpropane allyl ether isomers—4.37 wt %; and toluene—0.05 wt %. The trisiloxane formed in this example has two hydroxyl functional groups. A reaction scheme of this example is illustrated immediately below.

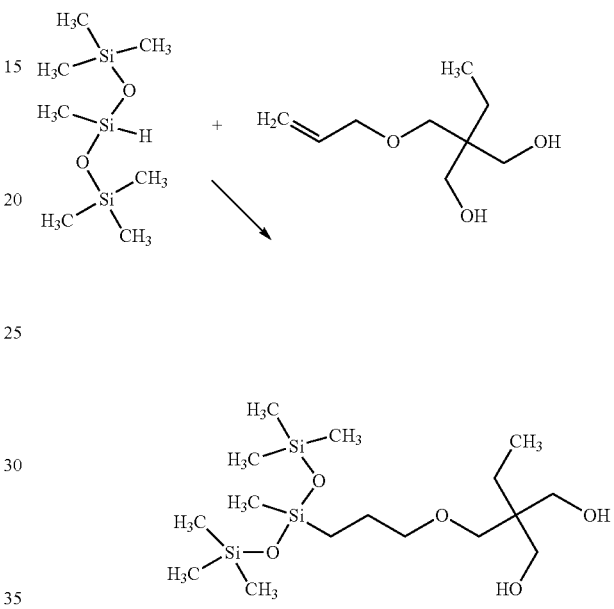

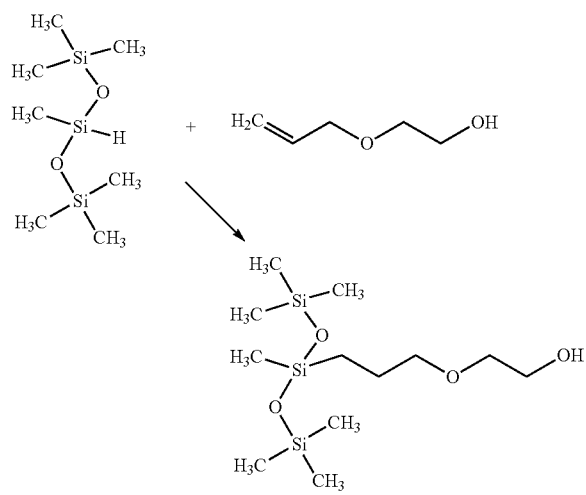

Example 2: Hydrosilylation of Heptamethyltrisiloxane and Trimethylolpropane Allyl Ether 10.75 g of heptamethyltrisiloxane (98%, TCI America) and 20 g of toluene (≥99.5%, Fisher Scientific) were added to a reaction flask under a nitrogen purge and mixed with a magnetic stirrer. The mixture was kept under the nitrogen purge and heated to 40° C. A syringe was loaded with 11.37 g of trimethylolpropane allyl ether (98%, Aldrich) and placed into a syringe pump. Once at 40° C., the trimethylolpropane allyl ether was metered into the reaction at ~250 μL/min. After ~5% of trimethylolpropane allyl ether was added, 87.9 μL of a 1% platinum complex in hexamethyldisiloxane was added. The reaction exothermed initially and as the remaining trimethylolpropane allyl ether was added reaching a maximum temperature of 58.9° C. 9.44 g total of trimethylolpropane allyl ether was added. The reaction was held at 60° C. for 3 hours and then allowed to cool.

The resulting sample was treated with activated carbon and filtered. Unreacted BisH and toluene were stripped off using a rotary evaporator for 1 hour (60° C., <10 mbar). The

Example 3: Preparation of Trisiloxane Monoglycerol 125.58 g of 1,1,1,3,5,5,5-Heptamethyltrisiloxane (BisH), 22.5 g of allyl glycerol and 168 g of isopropyl alcohol (IPA) were added to a reaction flask under a nitrogen purge and mixed by an agitator. The mixture was kept under the nitrogen purge and heated to 70° C. 0.3 g of a 1.1% platinum complex in hexamethyldisiloxane/IPA was added. The reaction exothermed initially. 25.2 g of allyl glycerol, 16.8 g of IPA and 0.3 g of 1.1% platinum complex in hexamethyldisiloxane/IPA were added as a 2nd step. 25.2 g of allyl glycerol, 12.6 g of IPA and 0.3 g of 1.1% platinum complex in hexamethyldisiloxane/IPA were added as a 3rd step. 16.8 g of allyl glycerol, 12.6 g of IPA and 0.209 g of 1.1% platinum complex in hexamethyldisiloxane/IPA were added as a 4th step. 89.7 g total of allyl glycerol was added for 125.58 g total of BisH. The reaction was held at 70° C. for 6 hours and then allowed to cool.

The sample was treated with activated carbon and filtered. Unreacted BisH and IPA were stripped off using a vacuum pump for 2 hours (80° C., <10 mmHg). 1H, 29Si and 13C confirmed the target hydrosilylated reaction product, with only trace isomers remaining. Specifically, the chemical composition after stripping was as follows: BisH-allyl glycerol—96.50 wt %; and allyl glycerol isomers—3.50 wt %. The trisiloxane formed in this example has two hydroxyl functional groups as illustrated immediately below.

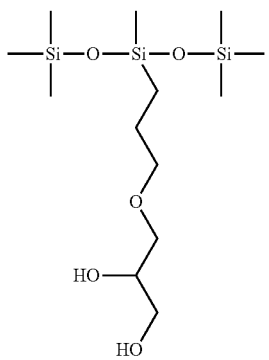

Example 4: Hydrosilylation of BisH and Allyl Glycerol 12.096 g of BisH and 20.00 g of IPA were mixed in a reaction flask under a nitrogen purge and heated to 40° C. A syringe was loaded with 7.904 g of allyl glycerol and then loaded into a syringe pump. Once at 40° C., the allyl glycerol was metered into the reaction at 669 μL/min. A 1% solution of Karstedt's catalyst in hexamethyldisiloxane (98.98 μL) was added after ~5% of the allyl glycerol had been added to yield 18 ppm Pt catalyst. The reaction was allowed to exotherm and cool down to 60° C. after all of the allyl glycerol was added. The reaction was then held at 60° C. for 3 hours and then allowed to cool.

Unreacted BisH and IPA were stripped off using a Rotovap for 3 hours (75° C., 3 mbar). The chemical composition after stripping was as follows: BisH-3-allyloxy-1,2-propane diol—95.36 wt %; and isomers—4.64 wt %. The trisiloxane formed in this example has two hydroxyl functional groups. A reaction scheme of this example is illustrated immediately below.

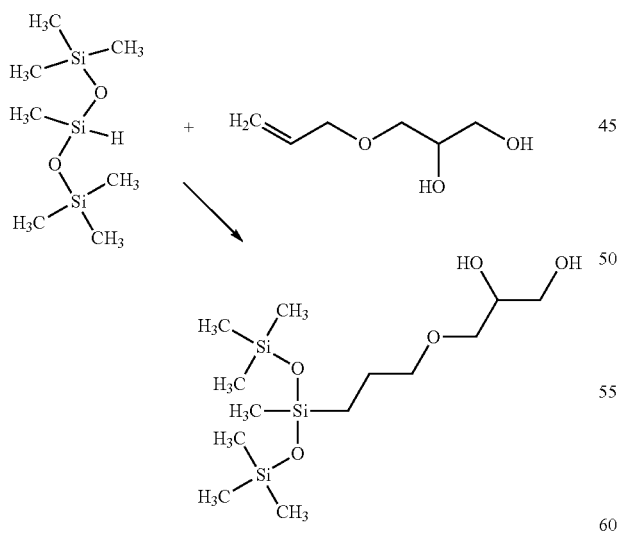

Example 5: Hydrosilylation of Heptamethyltrisiloxane and Allyl Glycidyl Ether 71.22 g of BisH and 43.78 g of allyl glycidyl ether (AGE) were mixed in a reaction flask under a nitrogen purge and heated to 60° C. Once at 60° C., a 1% solution of Karstedt's catalyst in IPA was added to the solution (24.42 μL) to yield 8 ppm Pt. The reaction was allowed to exotherm and cool down to 75° C. The reaction was held at 75° C. for 3 hours and then allowed to cool.

Unreacted BisH, excess AGE, and AGE isomers were stripped off using simple vacuum distillation for 3 hours (90° C., 5 mmHg). The chemical composition after stripping was as follows: BisH-AGE—100.00 wt %. A reaction scheme of this example is illustrated immediately below.

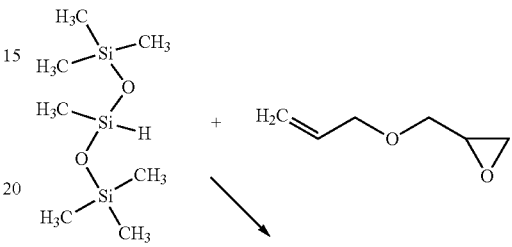

Example 6: Epoxy Ring-Opening Reaction of BisH-AGE and Diethanolamine 83.430 g of the epoxy functional trisiloxane intermediate produced in Example 5, 26.056 g of diethanolamine (DEA), and 30.000 g of IPA were added to a reaction flask. The reaction was performed in an inert atmosphere using a nitrogen purge across the reaction solution. The reaction was then heated to 75° C. and held at these conditions until completion.

The IPA was removed using simple vacuum distillation for 3 hours (45° C., ~5 mmHg). The reaction progress was tracked via H1 NMR. The reaction was considered complete once the CH peak on the epoxy shifted completely from ~3.1 ppm to ~3.9 ppm. The chemical composition after vacuum distillation was as follows: BisH-AGE-DEA—99.70 wt %; and IPA—0.30 wt %. The trisiloxane formed in this example has three hydroxyl functional groups. A reaction scheme of this example is illustrated immediately below.

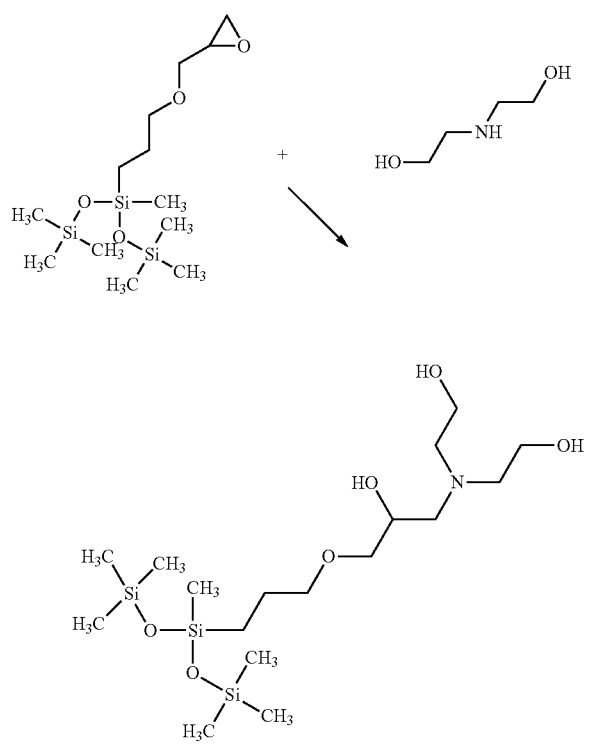

Example 7: Epoxy Ring-Opening Reaction of BisH-AGE and Diisopropanolamine 65.849 g of the epoxy functional trisiloxane intermediate produced in Example 5, 26.052 g of diisopropanolamine (DIPA), and 30.000 g of IPA were added to a reaction flask. The reaction was performed in an inert atmosphere using a nitrogen purge across the reaction solution. The reaction was then heated to 75° C. and held at these conditions until completion.

The IPA was removed using simple vacuum distillation for 3 hours (45° C., ~5 mmHg). The reaction progress was tracked via H1 NMR. The reaction was considered complete once the CH peak on the epoxy shifted completely from ~3.1 ppm to ~3.9 ppm. The chemical composition after vacuum distillation was as follows: BisH-AGE-DIPA—99.70 wt %; and IPA—0.30 wt %. The trisiloxane formed in this example has three hydroxyl functional groups. A reaction scheme of this example is illustrated immediately below.

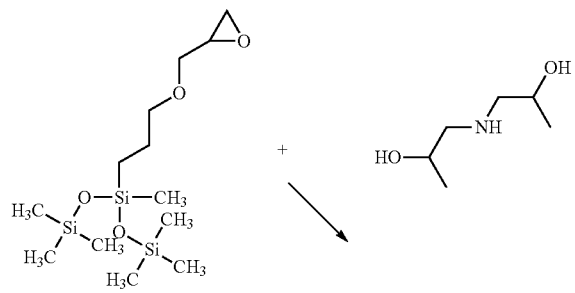

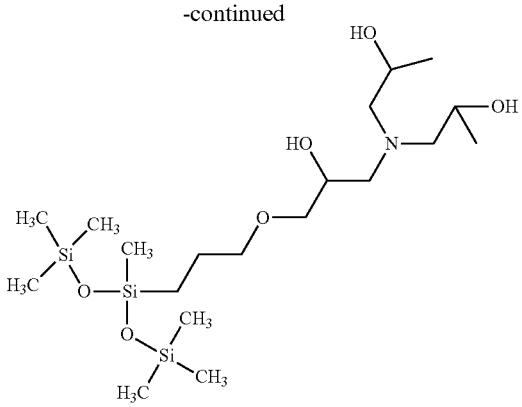

Example 8: Hydrosilylation of BisH and Allyl Diglycerol 56.81 g of BisH and half of the total allyl diglycerol (71.19 g total) were mixed in a reaction flask under a nitrogen purge and heated to 45° C. Once at 45° C., a 1% solution of Karstedt's catalyst in IPA (25.48 µL) was added to yield 8 ppm Pt. The reaction was allowed to exotherm and cool down to 80° C. The second half of the allyl diglycerol was added to the reaction solution. The reaction was once again allowed to exotherm and cool to 70° C. The reaction was then held at 70° C. for 4 hours and then allowed to cool.

The chemical composition after reaction was as follows: BisH-allyl diglycerol—88.88 wt %; and isomers—11.12 wt %. The trisiloxane formed in this example has three hydroxyl functional groups as illustrated immediately below.

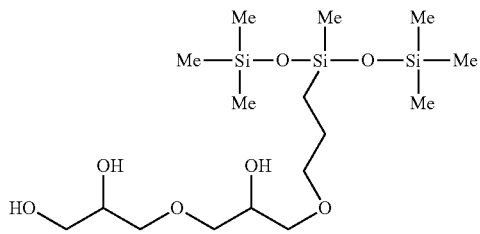 [SMILES: C[Si](C)(C)O[Si](C)(CCCOCC(O)COCC(O)CO)O[Si](C)(C)C]

Example 9: Hydrosilylation of BisH and Allyl Xylitol 9.739 g of allyl xylitol and 20.017 g of IPA were mixed in a reaction flask under a nitrogen purge and heated to 50° C. A syringe was loaded with 10.261 g of BisH and then loaded into a syringe pump. Once at 50° C., the BisH was metered into the reaction at 881 µL/min. A 1% solution of Karstedt's catalyst in hexamethyldisiloxane (83.96 µL) was added after ~5% of the BisH had been added to yield 16 ppm Pt. The reaction was allowed to exotherm and cool down to 60° C. after all of the BisH was added. The reaction was then held at 60° C. for 3 hours and then allowed to cool.

Unreacted BisH and IPA were stripped off using a Rotovap for 3-5 hours (75° C., 3 mbar). The chemical composition after stripping was as follows: BisH-allyl xylitol—97.74 wt %; and isomers—2.86 wt %. The trisiloxane formed in this example has four hydroxyl functional groups. A reaction scheme of this example is illustrated immediately below.

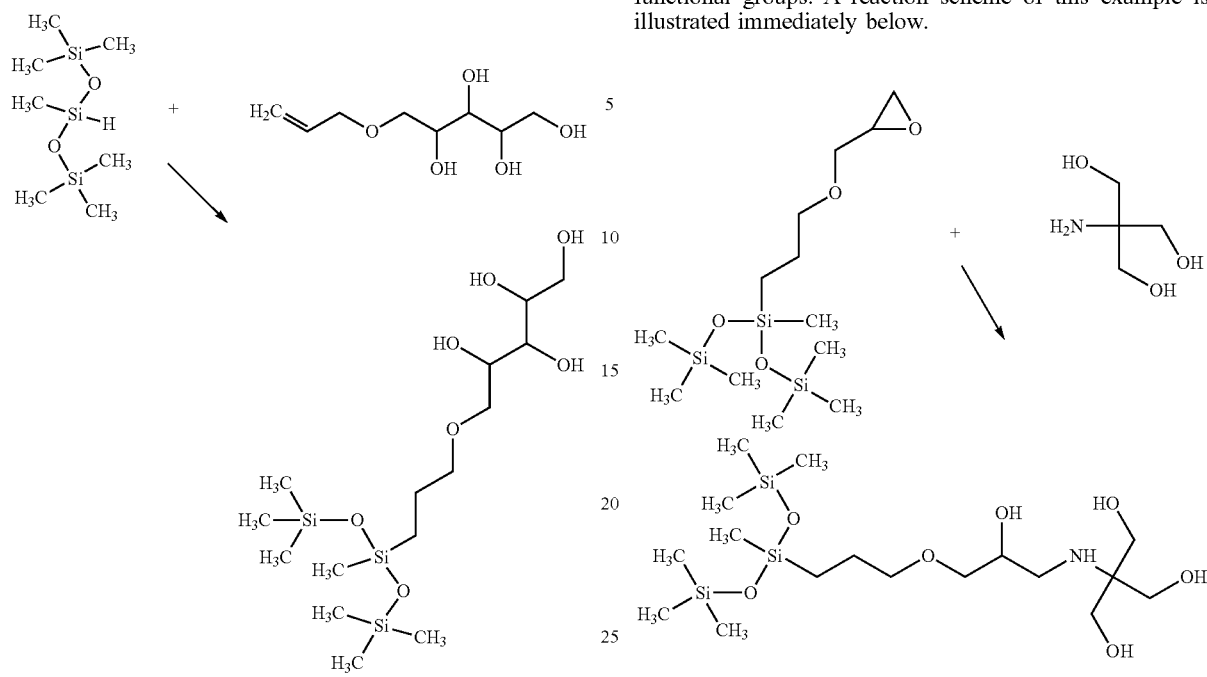

functional groups. A reaction scheme of this example is illustrated immediately below.

Example 10: Epoxy Ring-Opening Reaction of BisH-AGE-Tris(Hydroxymethyl) Aminomethane 5.516 g of the epoxy functional trisiloxane intermediate produced in Example 5, 1.984 g of tris(hydroxymethyl) aminomethane (Tris), 5.250 g of methanol and 12.250 g of IPA were added to a reaction flask. The reaction was performed in an inert atmosphere using a nitrogen purge across the reaction solution. The reaction was then heated to 75° C. and held at these conditions until the reaction was complete.

The IPA and methanol were stripped off using a Rotovap (75° C., 3 mbar). The reaction progress was tracked via H1 NMR. The reaction was considered complete once the CH peak on the epoxy shifted completely from ~3.1 ppm to ~3.9 ppm. The chemical composition after stripping was as follows: BisH-AGE-Tris—99.70 wt %; and IPA—0.30 wt %. The trisiloxane formed in this example has four hydroxyl functional groups. A reaction scheme of this example is illustrated immediately below.

Example 11: Epoxy Ring-Opening Reaction of BisH-AGE and n-Methylglucamine 15.824 g of the epoxy functional trisiloxane intermediate produced in Example 5, 9.176 g of n-methylglucamine (NMG), 8.750 g of methanol and 16.250 g of IPA were added to a reaction flask. The reaction was performed in an inert atmosphere using a nitrogen purge across the reaction solution. The reaction was then heated to 75° C. and held at these conditions for until the reaction was complete.

The methanol and IPA were stripped off using a Rotovap for 3 hours (75° C., 3 mbar). The reaction progress was tracked via H1 NMR. The reaction was considered complete once the CH peak on the epoxy shifted completely from ~3.1 ppm to ~3.9 ppm. The chemical composition after stripping was as follows: BisH-AGE-NMG—98.20 wt %; and IPA—1.80 wt %. The trisiloxane formed in this example has six hydroxyl functional groups. A reaction scheme of this example is illustrated immediately below.

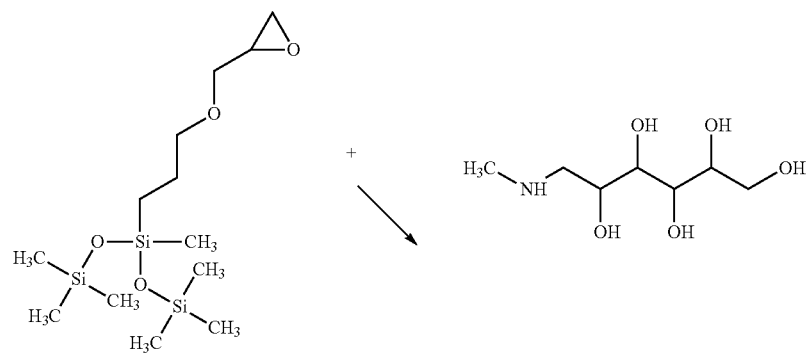

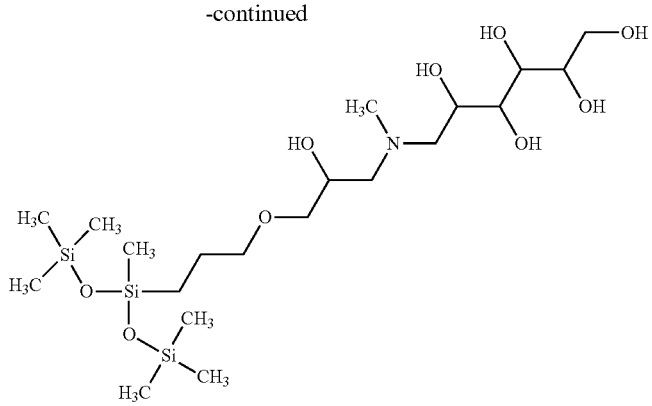

Example 12: Epoxy DNA-Opening Reaction of AGE and DIPA 12.855 g of AGE, 12.500 g of DIPA, and 24.645 g of toluene were added to a reaction flask. The reaction was performed in an inert atmosphere using a nitrogen purge across the reaction solution. The reaction was then heated to 75° C. and held at these conditions until completion.

The toluene was stripped off using a Rotovap for 3 hours (75° C., 3 mbar). The reaction progress was tracked via H1 NMR. The reaction was considered complete once the CH peak on the epoxy shifted completely from ~3.1 ppm to ~3.9 ppm. The chemical composition after stripping was as follows: AGE-DIPA—99.70 wt %; and toluene—0.30 wt %. A reaction scheme of this example is illustrated immediately below (where each R is a propanol group).

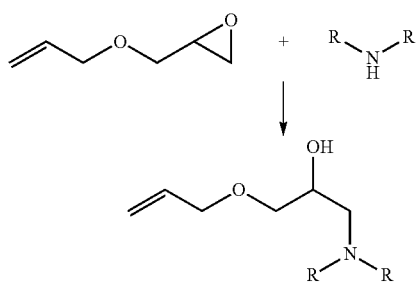

Example 13: Hydrosilylation of BisH and Allyl AGE-DIPA 1.2594 g of BisH, 1.266 g of the allyl AGE-DIPA material produced in Example 12, and 2.052 g of IPA were mixed in a reaction flask under a nitrogen purge and heated to 60° C. Once at 60° C., a 1% solution of Karstedt's catalyst in hexamethyldisiloxane (20.26 µL) was added to the solution to yield 30 ppm Pt. The reaction was allowed to exotherm and cool down to 70° C. The reaction was then held at 70° C. until completion.

The reaction was considered complete when there was no longer an unreacted Si—H peak at ~4.56 ppm in the H1 NMR spectra. The IPA was stripped off using a Rotovap for 4 hours (75° C., 3 mbar). The chemical composition after stripping was as follows: BisH-AGE-DIPA—89.77 wt %; AGE-DIPA isomers—9.99 wt %; and IPA—0.24 wt %. The trisiloxane formed in this example has three hydroxyl functional groups. A reaction scheme of this example is illustrated immediately below.

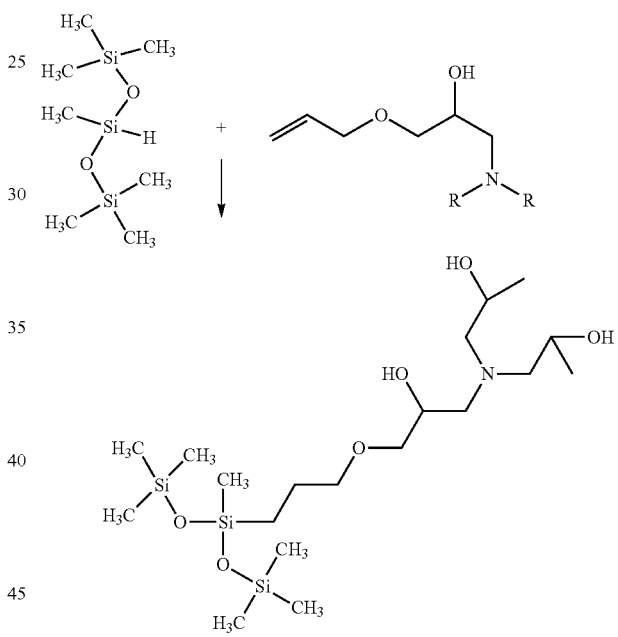

Example 14 (Prophetic): Hydrosilylation of BisH and Allyl Sorbitol 10.3 g of allyl sorbitol and 20.017 g of IPA are mixed in a reaction flask under a nitrogen purge and heated to 50° C. A syringe is loaded with 10.3 g of BisH and then loaded into a syringe pump. Once at 50° C., the BisH is metered into the reaction at 881 µL/min. A 1% solution of Karstedt's catalyst in hexamethyldisiloxane (83.96 µL) is added after ~5% of the BisH has been added to yield 16 ppm Pt. The reaction is allowed to exotherm and cool down to 60° C. after all of the BisH is added. The reaction is then held at 60° C. for 3 hours and then allowed to cool.

Unreacted BisH and IPA are stripped off using a Rotovap for 5 hours (75° C., 3 mbar). The chemical composition after stripping is estimated as follows: BisH-allyl sorbitol—96.0 wt %; and isomers—4.0 wt %. The trisiloxane formed in this example has five hydroxyl functional groups. A reaction scheme of this example is illustrated immediately below.

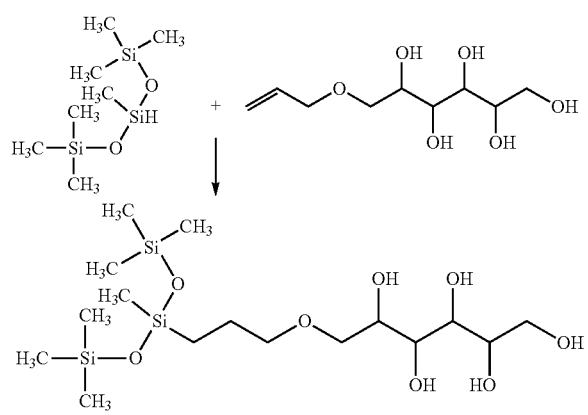

Surfactancy Assessments

Various trisiloxane materials including trisiloxane polyether materials were studied in view of the EU detergent directive ("directive"; EC No. 648/2004). It was found that many trisiloxane polyether materials, especially those containing high levels of polyethylene oxide, were classifiable as "surfactants" according to the directive. Thus, such surfactants are bound by the corresponding biodegradability requirements of the directive. In contrast, other trisiloxane materials were found to be outside the scope of classifiable surfactants according to the directive. Thus, such "non-surfactants" are generally considered non-water soluble fluids or form solid particulates in water and as such are not bound by the corresponding biodegradability requirements of the directive. As such, certain non-surfactant trisiloxanes can be utilized in Europe in detergent composition because they comply with the directive.

The directive essentially states that if a material is classified as a surfactant in must pass certain biodegradation protocols. A surfactant was generally defined as a material capable of:

1) reducing the surface tension of water to ≤45 dynes/cm (or ≤45 mN/m) at a concentration of 0.5 wt % of the material in water;
2) forming spreading or adsorption monolayers at an air/water interface;
3) forming emulsions, microemulsions and/or micelles; and
4) adsorption at a water/solid interface.

The biodegradation requirements were generally determined by the amount of $CO_2$ liberated/mole of material. Alternately, biodegradation can be measured by the amount of oxygen consumed during the degradation process. Because silicone materials do not normally degrade liberating $CO_2$ or by consuming oxygen, they do not pass this requirement. As such, a protocol was developed to determine if a silicone material was indeed a surfactant. Utilizing this protocol, existing trisiloxane polyether materials, which are primarily high in EO content, are considered surfactants and additionally do not pass the biodegradation standards in general.

Surface tension of an aqueous solution, fluid, or mixture can readily be determined by various methods understood in the art. Generally, for stable solutions or mixtures, an equilibrium method such as the Wilhelmy plate method or Du Noüy ring method can be utilized. Alternately, for more dynamic systems, a pendant drop method can be utilized. This technique results in a fresh surface for each measurement. This method is also useful to reduce the potential for insoluble hydrophobic impurities or oils which could impact the surface tension measurement resulting in artificially low surface tension values.

In view of the directive and protocol above, various trisiloxane materials were evaluated including trisiloxane polyether materials containing polyethylene oxide groups and the trisiloxanes formed according to the Examples above. Per the protocols established for the directive, each of the trisiloxane polyether containing polyethylene oxide materials evaluated were classified as a surfactant. Such "surfactants" cannot be marketed for or utilized in EU detergent compositions. Without being bound or limited to any particular theory, it is thought that some trisiloxane polyethers containing all PO or EO/PO groups with low levels of EO in the ratio may also be low in solubility and may thus be shown to be non-surfactants per this protocol.

Figure 3:
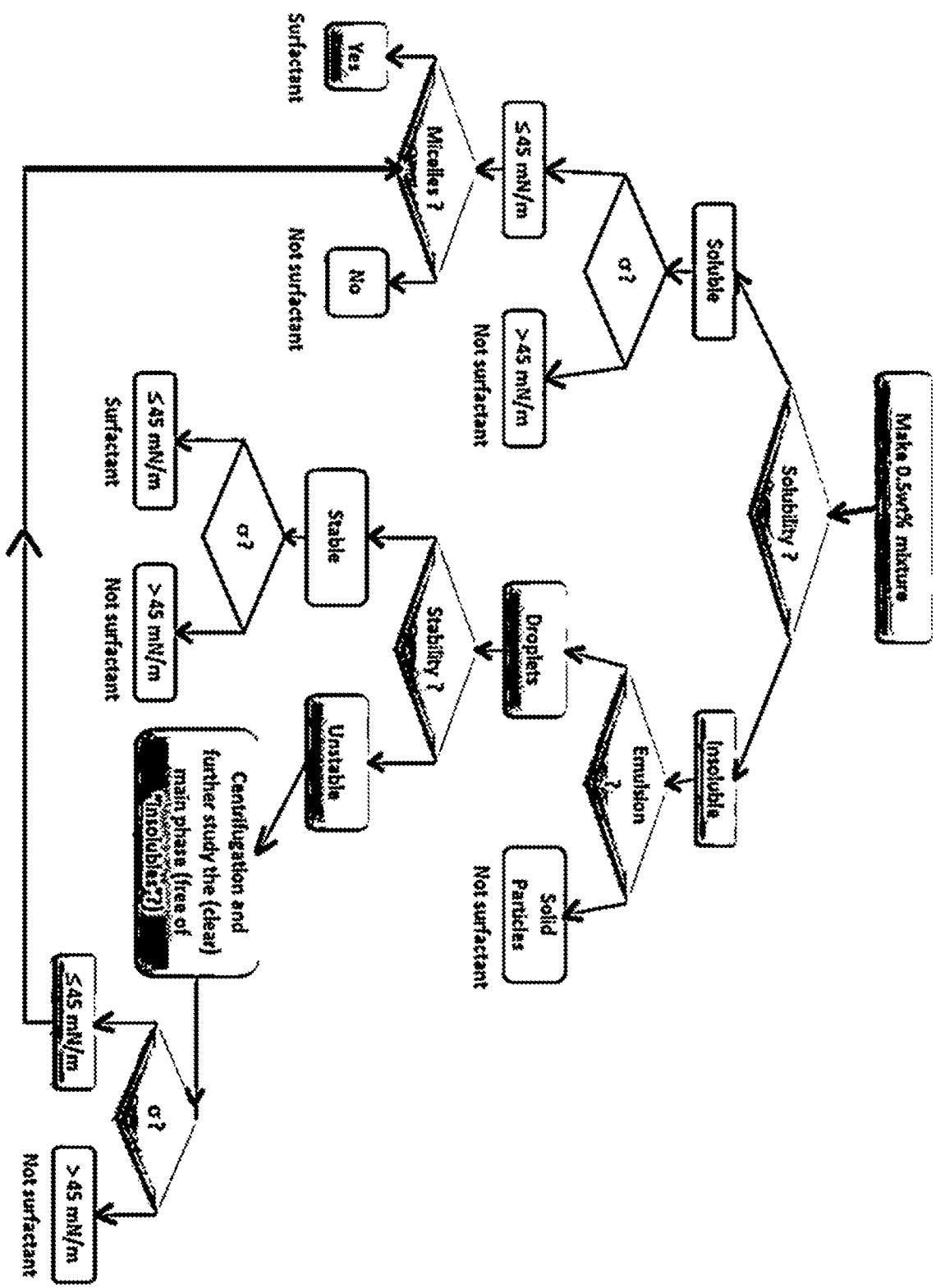
FIG. 3 is a flow chart illustrating the surfactancy determination of an example trisiloxane where the example trisiloxane is deemed to be a surfactant according to a protocol developed for the EU detergent directive.

An example of such a surfactant assessment/classification is illustrated in the flow diagram of FIG. 3. Referring to the protocol illustrated in FIG. 3, the initial assessment is whether or not a 0.5 wt % mixture of the material being tested is soluble in water. Mixtures were prepared by adding 0.5% of the material to distilled water at 20° C. and mixing with a magnetic stir bar for one hour. If the material is soluble in water, as indicated, for example, by the formation of a clear or slightly hazy mixture, then surface tension (σ) is determined. If σ is >45 mN/m, the material is not classified as a surfactant. If σ is ≤45 mN/m, and micelles are not present, the material is not classified as a surfactant. Conversely, if micelles are present, the material is classified as a surfactant.

If the material is not soluble in water, and no emulsion is present (e.g. solid particles or gels are present instead), then the material is not classified as a surfactant. If an emulsion is present (e.g. droplets are present) and the emulsion in stable, then σ is determined. If σ is >45 mN/m, the material is not classified as a surfactant. Conversely, if σ is ≤45 mN/m, the material is classified as a surfactant.

If the material is not soluble in water, and an emulsion is present (e.g. droplets are present) and the emulsion is not stable, the emulsion is then centrifuged. The (clear) main phase (or supernatant) of the emulsion is further studied and the a is determined. If σ is >45 mN/m, the material is not classified as a surfactant. Conversely, if σ is ≤45 mN/m, and micelles are not present, the material is not classified as a surfactant. Conversely, if micelles are present, the material is classified as a surfactant.

In view of this protocol, the trisiloxanes formed in Examples 1, 2, 3, 4, 6-10, and 13 were classified as non-surfactants. Specifically, each of these trisiloxanes failed to be a surfactant according to the aforementioned protocol/flow diagram. Such "non-surfactants" can be marketed for or utilized in EU detergent compositions. Obviously, they can also be used elsewhere in the world.

Some of the trisiloxanes including mostly those having one or two hydroxyl groups, formed one or more oil layers that are unstable and/or not water soluble. Such oil layers may also not form stable emulsions or micelles in water. As the number of hydroxyl groups increases to three or four per trisiloxane the situation generally changes. In addition to forming a separate oil layer that is not stable and phase separates, some of these materials may form a solid particulate or gel. Even after mixing overnight, a 0.5 wt % mixture of these materials in water did not solubilize. It is believed that Example 14 would have similar results. All of these would be considered "non-surfactants." It is thought that other trisiloxane compositions containing similar numbers of hydroxyl groups would exhibit similar non-surfactant behavior.

As for Example 11, it was considered to be a surfactant according to the protocol/flow diagram. For example, the trisiloxane of Example 11 was generally insoluble, formed a hazy mixture, was stable, and yielded an aqueous surface tension of 545 dynes/cm. It is to be appreciated that further evaluation of Example 11 may yield different results in this regard. In addition, it is to be appreciated that such materials can be used elsewhere in the world and/or for different types of compositions/applications.

Because some of the trisiloxane materials above were deemed to be insoluble in water, ways in which to make them compatible in a detergent chassis or matrix were evaluated. It was found that one option to improve solubility of the insoluble trisiloxanes was to increase the concentration of dispersants (or solubilizers) in the detergent chassis.

The two tables below show two exemplary detergent compositions, one which has a low level of dispersant present (Table 1) and a second which has a significantly higher level of dispersant present (Table 2). The trisiloxane materials, including those of Examples 1 to 14, can be utilized in holes of the detergent compositions.

TABLE 1

| Component (wt %) | Detergent Comp. 1 |
| --- | --- |
| Solvent | 73.9% |
| Dispersant | 2.0% |
| Hydrotrope | 2.0% |
| Neutralization Agent | 2.4% |
| Anionic Surfactant 1 | 6.0% |
| Nonionic Surfactant | 3.0% |
| Anionic Surfactant 2 | 7.6% |
| Water Hardness Control Agent | 2.0% |
| hole | 1.0% |

TABLE 2

| Component (wt %) | Detergent Comp. 2 |
| --- | --- |
| Solvent | 62.4% |
| Dispersant | 16.2% |
| Hydrotrope | 1.8% |
| Neutralization Agent | 2.2% |
| Anionic Surfactant 1 | 5.3% |
| Nonionic Surfactant | 2.7% |
| Anionic Surfactant 2 | 6.6% |
| Water Hardness Control Agent | 1.8% |
| hole | 1.0% |

Solvent is DI water.

Dispersant is propylene glycol, which is commercially available form Fisher Scientific.

Hydrotrope is a 41% actives solution of sodium xylene sulfonate, which is commercially available from Stepan.

Neutralization Agent is a 45% KOH solution, which is commercially available form Fisher Scientific.

Anionic Surfactant 1 is a 96% actives solution of linear alkylbenzene sulfonic acid, which is commercially available from Stepan.

Nonionic Surfactant is a 100% actives ethoxylated $C_{11}$ alcohol (7 moles EO average), which is commercially available from Air Products.

Anionic Surfactant 2 is a 28% actives solution of sodium laureth sulfate (3 moles EO average), which is commercially available from Stepan.

Water Hardness Control Agent is sodium citrate, which is commercially available form Fisher Scientific.

It was found that of the trisiloxanes that were insoluble in detergent composition 1, they were generally soluble in detergent composition 2. Without being limited to any particular theory, it is thought that the increased levels of dispersant assists with solubility of the trisiloxanes in this regard. One of skill in the art can readily determine other suitable detergent compositions via routine experimentation.

The terms "comprising" or "comprise" are used herein in their broadest sense to mean and encompass the notions of "including," "include," "consist(ing) essentially of," and "consist(ing) of". The use of "for example," "e.g.," "such as," and "including" to list illustrative examples does not limit to only the listed examples. Thus, "for example" or "such as" means "for example, but not limited to" or "such as, but not limited to" and encompasses other similar or equivalent examples. The term "about" as used herein serves to reasonably encompass or describe minor variations in numerical values measured by instrumental analysis or as a result of sample handling. Such minor variations may be in the order of ±0-10, ±0-5, or ±0-2.5, % of the numerical values. Further, The term "about" applies to both numerical values when associated with a range of values. Moreover, the term "about" may apply to numerical values even when not explicitly stated.

Generally, as used herein a hyphen "-" or dash "—" in a range of values is "to" or "through"; a ">" is "above" or "greater-than"; a "≥" is "at least" or "greater-than or equal to"; a "<" is "below" or "less-than"; and a "≤" is "at most" or "less-than or equal to." On an individual basis, each of the aforementioned applications for patent, patents, and/or patent application publications, is expressly incorporated herein by reference in its entirety in one or more non-limiting embodiments.

It is to be understood that the appended claims are not limited to express and particular compounds, compositions, or methods described in the detailed description, which may vary between particular embodiments which fall within the scope of the appended claims. With respect to any Markush groups relied upon herein for describing particular features or aspects of various embodiments, it is to be appreciated that different, special, and/or unexpected results may be obtained from each member of the respective Markush group independent from all other Markush members. Each member of a Markush group may be relied upon individually and or in combination and provides adequate support for specific embodiments within the scope of the appended claims.

It is also to be understood that any ranges and subranges relied upon in describing various embodiments of the present invention independently and collectively fall within the scope of the appended claims, and are understood to describe and contemplate all ranges including whole and/or fractional values therein, even if such values are not expressly written herein. One of skill in the art readily recognizes that the enumerated ranges and subranges sufficiently describe and enable various embodiments of the present invention, and such ranges and subranges may be further delineated into relevant halves, thirds, quarters, fifths, and so on. As just one example, a range "of from 0.1 to 0.9" may be further delineated into a lower third, i.e., from 0.1 to 0.3, a middle third, i.e., from 0.4 to 0.6, and an upper third, i.e., from 0.7 to 0.9, which individually and collectively are within the scope of the appended claims, and may be relied upon individually and/or collectively and provide adequate support for specific embodiments within the scope of the appended claims. In addition, with respect to the language which defines or modifies a range, such as "at least," "greater than," "less than," "no more than," and the like, it is to be understood that such language includes subranges and/or an upper or lower limit. As another example, a range of "at least 10" inherently includes a subrange of from at least 10 to 35, a subrange of from at least 10 to 25, a subrange of from 25 to 35, and so on, and each subrange may be relied upon individually and/or collectively and provides adequate support for specific embodiments within the scope of the appended claims. Finally, an individual number within a disclosed range may be relied upon and provides adequate support for specific embodiments within the scope of the appended claims. For example, a range "of from 1 to 9" includes various individual integers, such as 3, as well as individual numbers including a decimal point (or fraction), such as 4.1, which may be relied upon and provide adequate support for specific embodiments within the scope of the appended claims.

The present invention has been described herein in an illustrative manner, and it is to be understood that the terminology which has been used is intended to be in the nature of words of description rather than of limitation. Many modifications and variations of the present invention are possible in light of the above teachings. The present invention may be practiced otherwise than as specifically described within the scope of the appended claims. The subject matter of all combinations of independent and dependent claims, both single and multiple dependent, is herein expressly contemplated.

What is claimed is:

1. A detergent composition comprising a) a dispersant comprising propylene glycol;
   b) an anionic surfactant;
   c) a nonionic surfactant; and
   d) a trisiloxane of the following general formula (I):

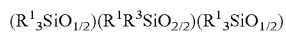

$(R^1{}_3SiO_{1/2})(R^1R^3SiO_{2/2})(R^1{}_3SiO_{1/2})$ (I);

wherein each $R^1$ is an independently selected hydrocarbyl group and $R^3$ is selected from the following groups (i) to (iii) and (v) to (x);

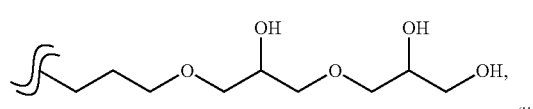

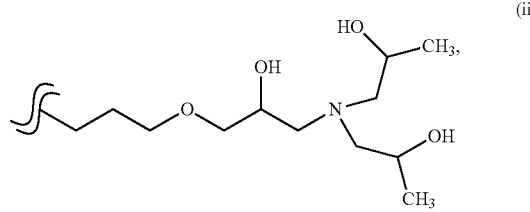

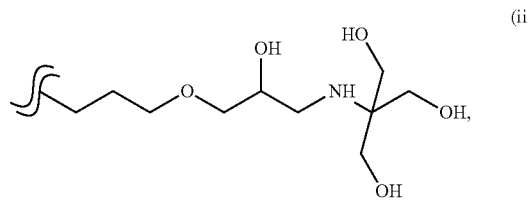

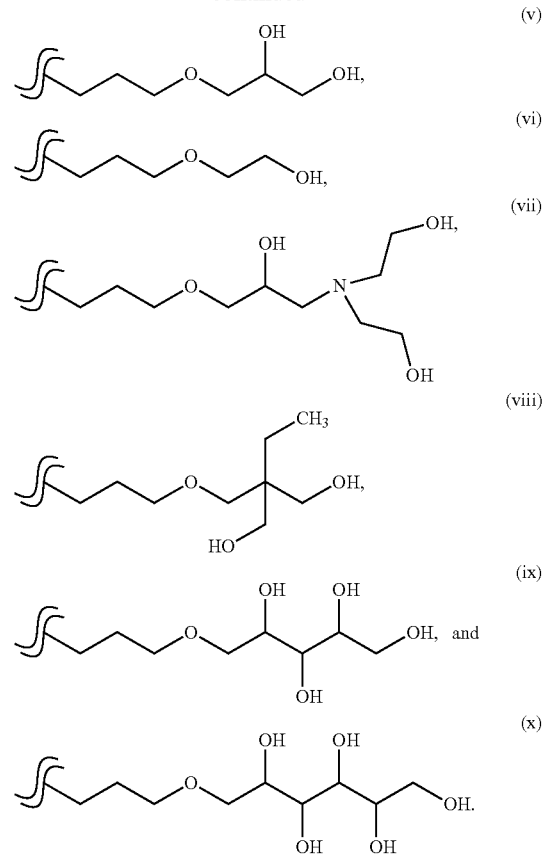

2. The detergent composition as set forth in claim 1, wherein each $R^1$ is an independently selected $C_1$-$C_6$ alkyl group.

3. The detergent composition as set forth in claim 1, wherein the dispersant is present in an amount of from about 0.01 to about 50, alternatively in an amount of from about 0.1 to about 40, part(s) by weight, based on 100 parts by weight of the detergent composition.

4. The detergent composition as set forth in claim 1, further comprising water and further defined as an aqueous detergent composition.

5. The detergent composition as set forth in claim 1, further comprising at least one surfactant.

6. The detergent composition as set forth in claim 1, further defined as a dishwashing detergent composition, a laundry detergent composition, a stain removal/pre-treatment composition, or a hard surface cleaning composition.

7. The detergent composition as set forth in claim 2, wherein each $R^1$ is a methyl group.

8. The detergent composition as set forth in claim 1, wherein $R^3$ is group (i).

9. The detergent composition as set forth in claim 1, wherein $R^3$ is group (ii).

10. The detergent composition as set forth in claim 1, wherein $R^3$ is group (iii).

11. The detergent composition as set forth in claim 1, wherein $R^3$ is group (v).

12. The detergent composition as set forth in claim 1, wherein $R^3$ is group (vi).

13. The detergent composition as set forth in claim 1, wherein $R^3$ is group (vii).

14. The detergent composition as set forth in claim 1, wherein $R^3$ is group (viii).

15. The detergent composition as set forth in claim 1, wherein $R^3$ is group (ix).

16. The detergent composition as set forth in claim 1, wherein $R^3$ is group (x).

17. The detergent composition as set forth in claim 6, further defined as an auto dishwashing (ADW) detergent composition.

* * * * *